(12) United States Patent
Ren et al.

(10) Patent No.: US 11,816,533 B2
(45) Date of Patent: Nov. 14, 2023

(54) LEARNING LATENT STRUCTURAL RELATIONS WITH SEGMENTATION VARIATIONAL AUTOENCODERS

(71) Applicant: Baidu USA, LLC, Sunnyvale, CA (US)

(72) Inventors: Shaogang Ren, Redmond, WA (US); Hongliang Fei, Sunnyvale, CA (US); Dingcheng Li, Sammamish, WA (US); Ping Li, Bellevue, WA (US)

(73) Assignee: Baidu USA LLC, Sunnyvale, CA (US)

( * ) Notice: Subject to any disclaimer, the term of this patent is extended or adjusted under 35 U.S.C. 154(b) by 534 days.

(21) Appl. No.: 16/951,158

(22) Filed: Nov. 18, 2020

(65) Prior Publication Data
US 2022/0156612 A1   May 19, 2022

(51) Int. Cl.
*G06N 5/04*      (2023.01)
*G06N 3/088*    (2023.01)
*G06N 3/045*    (2023.01)

(52) U.S. Cl.
CPC ............. *G06N 5/042* (2013.01); *G06N 3/045* (2023.01); *G06N 3/088* (2013.01)

(58) Field of Classification Search
CPC ............................... G06N 5/042; G06N 3/045
See application file for complete search history.

(56) References Cited

PUBLICATIONS

Locatello et al. "Object-Centric Learning with Slot Attention", 2020, NeurIPS, pp. 27.*
Chien et al. "Variational and Hierarchical Recurrent Autoencoder", ICASSP2019, pp. 3202-3206.*
Blobaum et al.,"Cause-Effect Inference by Comparing Regression Errors," In International Conference on Artificial Intelligence & Statistics, 900-909, 2018. (10pgs).
Hälvä et al.,"Hidden Markov Nonlinear ICA: Unsupervised Learning from Nonstationary Time Series," arXiv preprint arXiv:2006.12107, 2020. (15 pgs).
Hornik et al.,"Multilayer feedforward networks are universal approximators," Neural networks 2(5): 359-366, 1989. (8pgs).

(Continued)

*Primary Examiner* — Li Wu Chang
(74) *Attorney, Agent, or Firm* — NORTH WEBER & BAUGH LLP

(57) ABSTRACT

Learning disentangled representations is an important topic in machine learning for a wide range of applications. Disentangled latent variables represent interpretable semantic information and reflect separate factors of variation in data. Although generative models may learn latent representations and generate data samples as well, existing models may ignore the structural information among latent representations. Described in the present disclosure are embodiments to learn disentangled latent structural representations from data using decomposable variational auto-encoders, which simultaneously learn component representations and encode component relationships. Embodiments of a novel structural prior for latent representations are disclosed to capture interactions among different data components. Embodiments are applied to data segmentation and latent relation discovery among different data components. Experiments on several datasets demonstrate the utility of the present model embodiments.

20 Claims, 12 Drawing Sheets

(56) References Cited

PUBLICATIONS

Hyvarinen et al.,"Nonlinear ICA of Temporally Dependent Stationary Sources," Proceedings of Machine Learning Research, 2017. (10pgs).
Khemakhem et al."Variational Autoencoders & Nonlinear ICA: A Unifying Framework," Proc. of the 23rd Intr. Conf. on Artificial Intelligence & Statistics (AISTATS) 2020. (10pgs).
Ronneberger et al.,"U-Net: Convolutional Networks for Biomedical Image Segmentation," arXiv preprint arXiv:1505.04597, 2015. (8pgs).
Watters et al.,"Spatial Broadcast Decoder: A Simple Architecture for Learning Disentangled Representations in VAEs," arXiv preprint arXiv:1901.07017, 2019. (35 pgs).
Burgess et al.,"MONet: Unsupervised scene decomposition and representation," arXiv preprint arXiv: 1901.11390v1, 2019. (22 pgs).
M. Chen et al.,"A multi-task approach for disentangling syntax and semantics in sentence representations," arXiv preprint arXiv:1904.01173, 2019. (13pgs).
R. Chen et al.,"Isolating Sources of Disentanglement in VAEs," In NeurIPS, 2018. (11 pgs).
Liu et al.,"Deep learning face attributes in the wild," arXiv preprint arXiv: 1411.7766, 2015. (11 pgs).
Marino et al.,"Iterative Amortized Inference," In ICML, 2018. (10pgs).
Matthey et al.,"dsprites: Disentanglement testing sprites dataset," 2017.
[Online], [Retrieved Jun. 9, 2023]. Retrieved from Internet <URL: https://github.com/deepmind/dsprites-dataset/> (1 pg).
Mooij et al.,"Distinguishing Cause from Effect Using Observational Data: Methods and Benchmarks," The Journal of Machine Learning Research, 17(1):1103-1204, 2016. (102 pgs).
Spirtes et al.,"Causal discovery and inference: concepts and recent methodological advances," In Applied informatics, vol. 3, p. 3. Springer, 2016. (28pgs).
Van Steenkiste et al.,"Relational neural expectation maximization: Unsupervised discovery of objects and their interactions," arXiv preprint arXiv:1802.10353, 2018. (15pgs).
Xiao et al.,"DNA-GAN: Learning disentangled representations from multi-attribute images," In ICLR-Workshop, 2018. (14pgs).
Hyvarinen et al.,"Unsupervised Feature Extraction by Time-Contrastive Learning and Nonlinear ICA," In dvances in Neural Information Processing Systems, 2016. (9pgs).

A. Gretton,"A simpler condition for consistency of a kernel independence test," arXiv preprint arXiv:1501.06103, 2015. (4pgs).
Andrew J. Hanson,"Geometry for N-dimensional Graphics," Academic Press Professional, Inc, 1994.(23pgs).
Haufe et al.,"Sparse causal discovery in multivariate time series," In Causality: Objectives and Assessment, pp. 97-106, 2010. (10pgs).
Higgins et al.,"beta-vae: Learning basic visual concepts with a constrained variational framework," In ICLR, 2017. (22 pgs).
Iyyer et al.,"Adversarial example generation with syntactically controlled paraphrase networks," arXiv preprint arXiv:1804.06059, 2018. (11pgs).
Kabra et al.,"Multi-object datasets," [online], [Retrieved Jun. 9, 2023]. Retrieved from Internet <URL:https://github.com/deepmind/multiobject-datasets/> 2019. (1pg).
Karaletsos et al.,"Bayesian representation learning with oracle constraints," arXiv preprint arXiv:1506.05011, 2016. (16pgs).
Kim et al.,"Disentangling by factorising," In ICML, 2018. (10pgs).
Kingma et al.,"Auto-Encoding Variational Bayes," arXiv preprint arXiv:1312.6114, 2014. (14pgs).
Krantz et al.,"Analytical Tools: The Area Formula, the Coarea Formula, and Poincaré Inequalities," pp. 1-33. Birkhäuser Boston, Boston, 2008. (4pgs).
Xi Chen et al.,"InfoGAN: Interpretable Representation Learning by Information Maximizing Generative Adversarial Nets," In NIPS, 2016. (9 pgs).
L. Dinh et al., "Density Estimation Using Real NVP," arXiv preprint arXiv:1605.08803, 2016. (30pgs).
Eastwood et al.,"A framework for the quantitative evaluation of disentangled representations," In ICLR, 2018. (15pgs).
Ali Eslami et al.,"Attend, Infer, Repeat:Fast Scene Understanding with Generative Models," In 30th Conference on Neural Information Processing Systems (NIPS), 2016. (9 pgs).
Friedman et al.,"Gaussian process networks," arXiv preprint arXiv:1301.3857, 2013. (9pgs).
Glorot et al.,"Domain adaptation for large-scale sentiment classification: A deep learning approach," In ICML, 2011. (8pgs).
Goodfellow et al.,"Generative Adversarial Nets," In NIPS, 2014. (9pgs).
Greff et al.,"Multi-object representation learning with iterative variational inference," In ICML, 2019. (10pgs).
Greff et al.,"Tagger: Deep unsupervised perceptual grouping," In NIPS, 2016. (9 pgs).
Greff et al., "Neural expectation maximization," 31st Conference on Neural Information Processing Systems (NIPS), 2017. (11 pgs).

\* cited by examiner

900

For each tested epoch, there are two bars, which correspond, from left to right, to "Proposed" and "MONet". The order is the same for all tested epochs.

LEARNING LATENT STRUCTURAL RELATIONS WITH SEGMENTATION VARIATIONAL AUTOENCODERS

BACKGROUND

A. Technical Field

The present disclosure relates generally to systems and methods for computer learning that can provide improved computer performance, features, and uses. More particularly, the present disclosure relates to systems and methods to improve computer performance, features, and uses in learning latent structural relations.

B. Background

Deep neural networks have achieved great successes in many domains, such as computer vision, natural language processing, recommender systems, etc. Disentangled representation learning, which aims to learn factorized representations that discover and disentangle the latent explanatory factors in data, is a fundamental but challenging problem in machine learning and artificial intelligence. Interpretable disentangled representations have demonstrated their power in unsupervised learning and semi-supervised learning.

A major challenge to extract representations from images with multiple objects lies in an unsupervised setting and complicated interaction patterns. Most existing approaches may not be applied to this problem because it is challenging to integrate data segmentation and representation learning. Moreover, learning the complicated entity interactions in real-word requires a powerful and flexible prior for latent representations that may adaptively encode complicated structural relations.

Accordingly, what is needed are systems and methods to learn latent structural relations for improved computer performance, features, and uses.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
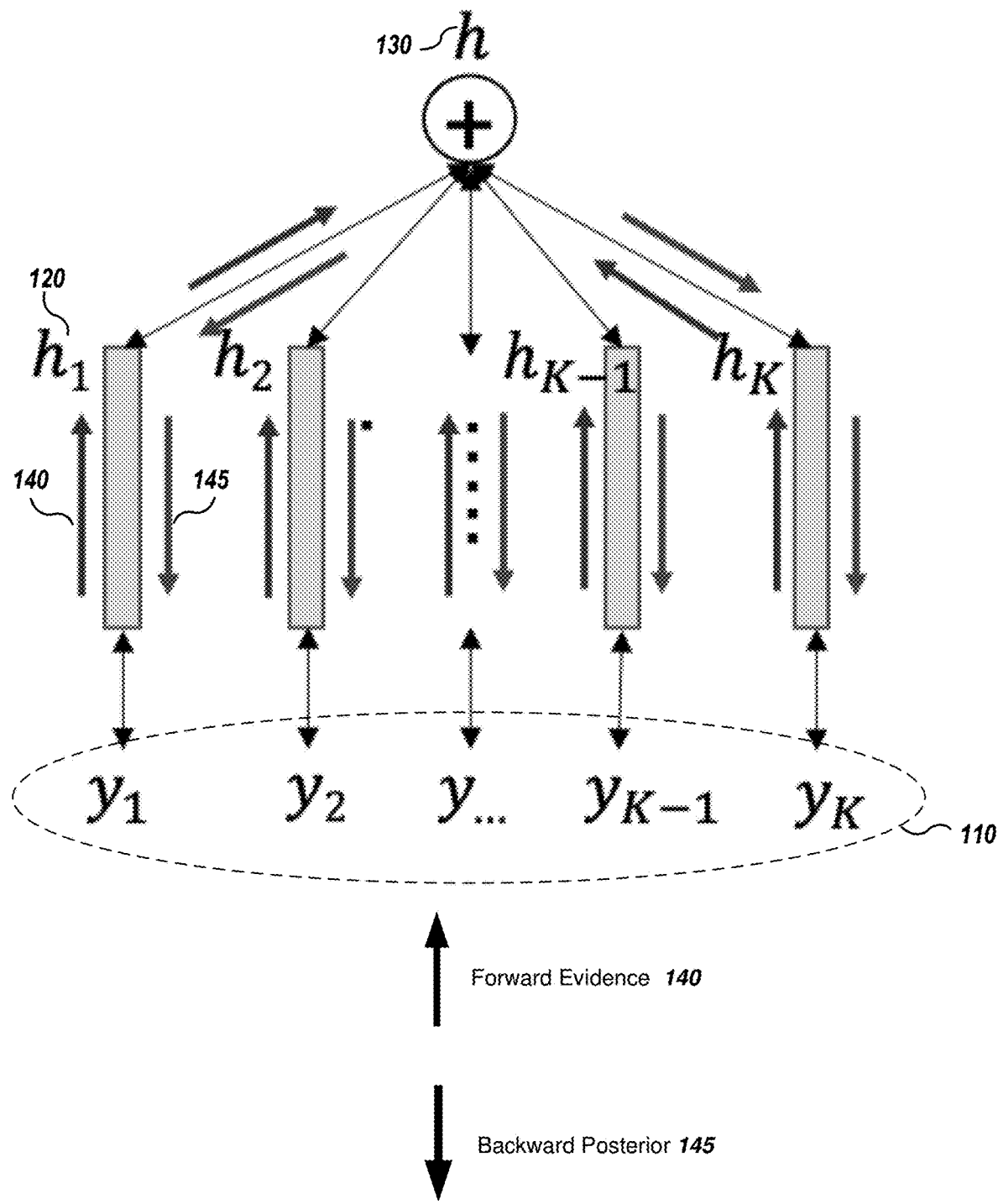
FIG. 1 depicts an aggregation prior model for encoding and decoding, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of image processing, aspects of the present disclosure are not so limited. Accordingly, the aspects of the present disclosure may be applied or adapted for use in other contexts, including but not limited to language processing.

A. General Introduction

Deep neural networks have achieved great successes in many domains, such as computer vision, natural language processing, recommender systems, etc. Disentangled representation learning, which aims to learn factorized representations that discover and disentangle the latent explanatory factors in data, is a fundamental but challenging problem in machine learning and artificial intelligence. Interpretable disentangled representations have demonstrated their power in unsupervised learning and semi-supervised learning.

Most existing methods for disentangled representation learning are based on Variational Auto-Encoders (VAEs) or Generative Adversarial Networks (GANs). The commonality of these works is that disentangled representations are extracted from a single entity or object in one data sample. Recently, there is growing research interest to integrate representation learning with scene segmentation by leveraging generative models. Similarly, very few of the methods consider the interaction among multiple objects or sample portions.

A major challenge to extract representations from images with multiple objects lies in an unsupervised setting and complicated interaction patterns. Most existing approaches may not be applied to this problem because it is challenging to integrate data segmentation and representation learning. Moreover, learning the complicated entity interactions in the real-world requires a powerful and flexible prior for latent representations that may adaptively encode complicated structural relations.

In the present disclosure, embodiments of a novel approach to learn object representations and encode object relations are presented. In one or more embodiments, the latent representation vector for each object or component in a scene is divided into two sections, a local section and a global section. Firstly, the local section controls the individual properties that are independent of the other objects. The global section, shared by all the objects in a scene, encodes the object relationships as well as the global latent factors. In one or more embodiments, the inference and interaction between different objects may be handled with a flow-based model. The flow-based structure prior of latent representation allows rigorous scores computation to estimate correlation and causality interaction between two components.

Embodiments of the present model have been applied to different datasets, and significant improvement has been obtained in scene segmentation and object representation learning by considering interactions among different components. Compared to existing methods, embodiments capture significantly more relations between objects. Theoretical properties of bi-level variational auto-encoder embodiments, such as the Evidence Lower Bound (ELBO), are also provided.

B. Some Related Work

Embodiments of the present disclosure is for developing an approach to disentangle the structural latent representation by leveraging deep generative models, which has direct applications in computer vision, image processing, and many other fields need to resolve data segmentation or data decomposition as well. In this section, some related works on scene or image segmentation in computer vision and disentanglement learning are reviewed.

1. Scene Segmentation

Recently, deep generative models have been integrated with unsupervised scene segmentation methods. Some proposed an approach to learn the representation of individual objects and scene segmentation simultaneously. Such a method of integrating iterative amortized inference and VAE is a fully unsupervised approach to learn visual concepts. With this method, a complete system may be trained end-to-end by simply maximizing its ELBO. MONet employed a recurrent attention network to discriminate different objects instead of using complicated amortized inference. The scene is segmented by leveraging the weighted objective with attention masks. At least one of the major differences between embodiments of the present disclosure and the aforementioned methods is that the objects in a scene may interact with each other in the present disclosure without the independence assumption among them.

2. Disentanglement

Variants of VAEs have achieved state-of-the-art (SOTA) performance for unsupervised disentanglement learning. One may assume a specific prior P(z) on the latent space and then parameterize the conditional probability P(x|z) with a deep neural network. The distribution P(z|x) is approximated using a variational distribution Q(z|x). The objective function for VAE may be expressed as:

$$\min_{\phi,\theta} \mathbb{E}_{P(x)}\left[-\mathbb{E}_{q_\phi(z|x)}[\log p_\theta(x|z)] + KL(q_\phi(z|x)\|p(z))\right]$$

The objective function is the ELBO. It is also possible to introduce various properties of the final presentation by modifying the KL term. Some proposed a β-VAE, in which a hyper-parameter β was introduced for the KL regularizer of vanilla VAEs. When β>1, β-VAE penalizes the mutual information between latent representation and data sample. There are several different approaches to learn disentangled data representation. Independent component analysis (ICA) has been extended to nonlinear cases to achieve disentanglement of variables.

Embodiments of the present disclosure involve developing a framework that may seamlessly integrate data segmentation and representation learning. In the present patent disclosure, a latent relational learning prior with message passing scheme and theoretical analysis are disclosed; embodiments of a bi-level VAE framework with a solid derivation of ELBO are presented; and embodiments of the presented framework have been applied to latent relational representation learning and component segmentation. Experiments show that segmentation and disentangled representation of different components may be improved with the inference mechanism of the presented structured VAE with the novel prior.

C. Embodiments for Decomposing Latent Variables

In this section, embodiments of information aggregation prior are first introduced. Afterwards, some detailed framework embodiments to learn disentangled structured latent factors are presented. In one or more embodiments, components may be referred to present objects in an image or different portions in a data sample.

In the present disclosure, embodiments of an aggregation model to learn interactions among data components are disclosed. The aggregation prior is then extended to bi-level decomposable variational auto-encoders (VAEs) that may learn disentangled latent structural representations from input data. Unlike some previous methods that ignore component or object interactions, embodiments of the present disclosure simultaneously learn component representation and encode component relationships with a bi-level VAE structure. In one or more embodiments, an auto-encoder for a second level or layer is parameterized with a flow-based model that allows performing relational inference, and it may also be taken as the structural prior for part of the first layer auto-encoder's latent distribution. In the present disclosure, theoretical property proofs, some empirical results, and detailed network architecture embodiments are provided. Notations in one or more model embodiments of the bi-level decomposable VAEs are listed in Table 1 shown below.

TABLE 1

Some notations used in one or more model embodiments.

| | |
|---|---|
| $x_k$ | the kth component |
| $m_k$ | mask for the kth component with attention network a |
| $\bar{x}_k$ | reconstruction of the kth component with decoder d |
| $\bar{m}_k$ | reconstruction of mask k with decoder d |
| $z_k$ | local latent variable for the kth component |
| $f_k$ | flow function for the kth component |
| $z_{0(k)}$ | global latent variable for the kth component |
| $\bar{z}_{0(k)}$ | reconstruction of $z_{0(k)}$ with flow function $f_k$ |
| $z_0$ | global latent variable or aggregated global latent variable |
| $z_k'$ | $z_k' = z_k z_{0(k)}$, overall latent variable for the kth component |
| $s_k$ | scope or attention net input for the kth component |
| a | attention network |
| e | encoder network |

TABLE 1-continued

Some notations used in one or more model embodiments.

| | |
|---|---|
| d | decoder network |
| $f$ | $f = \{f_1, f_2, \ldots, f_k\}$, second layer encoder |
| $f^{-1}$ | $f^{-1} = \{f_1^{-1}, f_2^{-1}, \ldots, f_k^{-1}\}$, second layer decoder |
| $\hat{z}_0$ | $\hat{z}_0 = [z_{0(1)}, z_{0(2)}, \ldots, z_{0(k)}]$ |
| $\bar{z}_0$ | $\bar{z}_0 = [\bar{z}_{0(1)}, \bar{z}_{0(2)}, \ldots, \bar{z}_{0(k)}]$ |

1. Latent Relational Learning with Message Passing Prior Embodiments

FIG. 1 depicts an aggregation prior model according to embodiments of the present disclosure. As shown in FIG. 1, $y=[y_1, y_2, \ldots, y_K]$ is the observed data 110, $y_k$ 120 is from data component k, and h 130 is the latent variable. Given observation y, the latent variable h may be inferred with forward message passing (encoding) 140, and the reconstruction of y may be obtained with backward message passing (decoding) 145. Here $h_k=f_k(y_k)$, $$h = \frac{1}{K}\sum_{k=1}^{K} h_k,$$

and reconstruction $\hat{y}_k=f_k^{-1}(h)$.

In one or more embodiments, relationship between $y_k$, $k=1, \ldots, K$ and h may be modeled with invertible flow-based networks. In one or more embodiments, flow function $f_k$ specifies a parametric invertible transformation from the distribution of $y_k$ to the latent variable $h_k$, i.e., $f_k: \mathcal{R}^l \to \mathcal{R}^l$ may be invertible. Here l is the dimension of $h_k$ and $y_k$. With $h_k=f_k(y_k)$, using the change-of-variables formula, the following equation may be obtained:

$$\log p(y_k) = \log p(h_k) + \log p\left(\left|\det\left(\frac{\partial f_k(y_k)}{\partial y_k}\right)\right|\right) \quad (1)$$

As shown in FIG. 1, the relation between h and $y_k$, $k=1$, K may be taken as the encoding (with $f=[f_1, f_2, \ldots, f_K]$) and decoding (with $f=[f_1^{-1}, f_2^{-1}, \ldots, f_K^{-1}]$) procedures. In one or more embodiments, h encodes y by aggregating outputs of all $f_k$, i.e., $$h = f(y) = \frac{1}{K}\sum_{k=1}^{K} f_k(y_k).$$

Therefore, the aggregated latent variable h may be a concise representation that may fully reconstruct all components of the data. In one or more embodiments, $f_k$, $k=1, \ldots, K$ may be enforced to ensure that $h_k=h$, and $y_k=\hat{y}_k=f_k^{-1}(h)$.

Latent Variable Aggregation In one or more embodiments, it is assumed that each entry of $h_k$, $k=1, \ldots, K$ follows Normal distribution, i.e., $h_k \sim N(\mu_k, \sigma^2)$. In one or more embodiments, the variance $\sigma^2$ is set as a fixed value across all components. With $$h = \frac{1}{K}\sum_{k=1}^{K} h_k,$$

the prior distribution for each entry of his a Normal distribution $N(\mu, \sigma^2)$. Based on an encoder and decoder VAE scheme, model parameters of the aggregation model may be learned by maximizing the ELBO, $$\log p_{f^{-1}}(y) \geq \mathcal{L}(y; f) = \mathbb{E}_{q_f(h|y)}[\log p_{f^{-1}}(y|h)] - KL(q_f(h|y)\|p(h)) \quad (2)$$

Given a batch of training samples, the ELBO value may be computed with the message passing procedures. In one or more embodiments, $$h = f(y) = \frac{1}{K}\sum_{k=1}^{K} f_k(y_k)$$

is used as the sample generated from $q_f(h|y)$. Given an h, it is expected that it may fully reconstruct the input data. In one or more embodiments, the reconstruction term $\log p_{f^{-1}}(y|h)$ in the ELBO of equation (1) may be computed with:

$$\log p_{f^{-1}}(y|h) = -\frac{1}{2\sigma_y^2}\|y - f^{-1}(h)\|^2 - \frac{1}{2\sigma^2}\sum_{k=1}^{K}\|h - h_k\|^2 + C = \quad (3)$$

$$-\sum_{k=1}^{K}\left\{\frac{1}{2\sigma_y^2}\|y_k - f_k^{-1}(h)\|^2 + \|h - f_k(y_k)\|^2\right\} + C$$

Here $$C = -lK\ln(2\pi) - \frac{lK}{2}\ln(\sigma_y^2) - \frac{lK}{2}\ln(2\pi) - \frac{lK}{2}\ln(\sigma^2).$$

In one or more embodiments, constant values for both $\sigma_y^2$ and $\sigma^2$ are used, hence the value of C may also be set as a constant. In one or more embodiments, h from a batch of training samples are used to approximate the KL term in (2).

In one or more embodiments, given a data sample $y=[y_1, y_2, \ldots, y_K]$, the following lemma regarding the likelihood value computed with the message passing scheme in FIG. 1 may be obtained.

Lemma 1. The log-likelihood of y can be approximated by $$\log p(y) \approx \log p(h) - \frac{1}{2}\log p(\det(J_{\hat{y}}(h)^\tau J_{\hat{y}}(h))) \quad (4)$$

Here $J_{\hat{y}}(h) = [J_{\hat{y}_1}^\tau(h), J_{\hat{y}_2}^\tau(h), \ldots, J_{\hat{y}_K}^\tau(h)]^\tau$.

Proof: The structure relation between h and $y=[y_1, y_2, \ldots, y_K]$ is given in FIG. 1, thus the Jacobian matrix regarding the functions mapping from h to the reconstruction $\hat{y}=[\hat{y}_1, \hat{y}_2, \ldots, \hat{y}_K]$ is defined in VW. With a training objective in equations (2) and (3), $y \approx \hat{y}$ may be obtained. The change of variable theorem is known in the context of geometric measure theory as the smooth coarea formula, which may be described as:

$$p(y) \approx p(h)\det(J_{\hat{y}}(h)^\tau J_{\hat{y}}(y))^{-\frac{1}{2}} \quad (5)$$

From equation (5), the log-likelihood for y may be obtained.

In one or more embodiments, one may compute Jacobian matrix of each flow function $f_k$, and thus obtain the log-likelihood values. In one or more embodiments, the correlation or causality relations between two data components is estimated. In an example with two components a and b, to estimate the value of component b with observed value of a, the latent value h with $\hat{h}=f_a(y_a)$, is first estimated. Then, an estimated $\hat{y}_b$ may be obtained as $\hat{y}_b=f_b^{-1}(f_a(y_a))$. Meanwhile, the conditional probability may be written as:

$$\log p(y_b|y_a) \approx \log p(\hat{h}) - \frac{1}{2}\log p(\det(J_{\hat{y}_b}(\hat{h})^\tau_{\hat{y}_b}(\hat{h}))) \quad (6)$$

In one or more embodiments, the inference scheme may be applied to component relation detection, which is discussed with mode details in section of component interaction inference.

Identifiability Let $y_{k,i}$ be the i-th entry of $y_k$. In one or more embodiments, a relation r between $y_{u,i}$ and $y_{v,j}$ is defined if there is a mapping or a function links them. A relation set r may include multiple relations. In one or more embodiments, r is used to represent the set of variables involved in r. In one or more embodiments, a relation set in the present disclosure may be a connected graph with r as the vertex set. Let $\mathcal{R}$ be the set of all relation sets in a data set $\mathcal{Y}$, it is easy to prove the following lemma regarding the recovery of relations.

Lemma 2. If variable relations in $\mathcal{R}$ are monotone, and $|\mathcal{R}| \leq \dim(h)$, then R can be approximately fully recovered.

Proof of Lemma 2: The ELBO for the aggregation model is $$\log p_{f^{-1}}(y) \geq \mathcal{L}(y; f) = \mathbb{E}_{q_f(h|y)}[\log p_{f^{-1}}(y|h)] - KL(q_f(h|y)\|p(h)) =$$

$$-\frac{1}{2\sigma_y^2}\|y - f^{-1}(h)\|^2 - \frac{1}{2\sigma^2}\sum_{k=1}^{K}\|h - h_k\|^2 - KL(q_f(h|y)\|p(h)) + C =$$

$$-\sum_{k=1}^{K}\left\{\frac{1}{2\sigma_y^2}\|y_k - f_k^{-1}(h)\|^2 + \frac{1}{2\sigma_y^2}\|h - f_k(y_k)\|^2\right\} -$$

$$KL(q_f(h|y)\|p(h)) + C$$

Here $C = -lK\ln(2\pi) - \frac{lK}{2}\ln(\sigma_y^2) - \frac{lK}{2}\ln(\sigma^2)$.

With $N(u, \sigma^2)$ as the prior for each entry of h, the KL term may be approximate with $$KL(q_f(h|y)\|p(h)) = \sum_{i=1}^{l}\frac{1}{2}\left\{\left(\frac{\hat{\sigma}_i}{\sigma}\right)^2 + \frac{(h_i - u)^2}{\sigma^2} - 1 + 2\ln\frac{\sigma}{\hat{\sigma}_i}\right\}.$$

Here $\hat{\sigma}_i$ is the ith entry of $\hat{\sigma}$, and $\hat{\sigma}$ may be approximated with a batch of training data samples. The KL term regularize the distributions of all entries of h to be close to prior $N(u, \sigma^2)$ individually and thus to be independent with each other.

Without loss of generalization, it may be assumed that $\sigma_y = \sigma = 1$. Maximizing the ELBO may be equivalent to the following optimization problem, $$\min_f \mathcal{L}_f = \quad (7)$$

$$\mathbb{E}_{y \sim P(y)}\left[\sum_{k=1}^{K}\{\|y_k - f_k^{-1}(h)\|_2^2 + \|h - f_k(y_k)\|_2^2\} + KL(q_f(h|y)\|p(h))\right]$$

-continued $$\text{s.t.} \quad \frac{1}{K}\sum_{k=1}^{K} f_k(y_k) = h$$

$$f_k(y_k) \geq 0, \quad k = 1, \ldots, K$$

In one or more embodiments, sigmoid function may be used as last step of each $f_k$, and u may be set as a non-negative function. In an example of a simple case with two variables $y_1$ and $y_2$, and l=dim(h)=1, assuming the relation as $y_1 = \phi(y_2)$, and $\phi$ is continuous, monotone and invertible, the objective Equation (7) may be rewritten as:

$$\min_{\{f_1, f_2\}} \mathbb{E}_{y \sim P(y)} \left[ \sum_{k=\{1,2\}} \{(y_k - f_k^{-1}(h))^2 + (h - f_k^{-1}(y_k))^2\} + KL(q_f(h|y) \| p(h)) \right] \quad (8)$$

$$\text{s.t.} \quad \frac{1}{2}(f_1(y_1) + f_2(y_2)) = h$$

$$f_1(y_1) \geq 0, \quad f_2(y_2) \geq 0$$

In one or more embodiments, $f_1(y_1) = f_2(y_2) = h$ may be obtained, with $y_2 = \phi(y_1)$, $f_2^{-1} f_1 = \phi$. Hence $f_1 = f_2 \circ \phi$ and $f_1^{-1} = \phi^{-1} \circ f_2^{-1}$. For multivariant, let $r \in \mathcal{R}$ be one of the relation sets involve multiple variables belong to v. Each relation set corresponding to an interaction graph with vertex variables in v from different components $y_k$, k=1, ..., K. Under the assumptions that the relations in $\mathcal{R}$ are monotone and invertible, any pair of variables from v may be linked with a function. With the assumption that any pair of variables from different relation sets or graphs are independent with each other, by maximizing the ELBO in equation (7), the VAE model may assign one of the independent latent variables $h_t$ to each relation set or graph. Therefore, as long as $|\mathcal{R}| \leq \dim(h)$, the relation sets in $\mathcal{R}$ may be approximately fully recovered with the 25 independence of the latent variables h.

With the invertible flow-based model, embodiments of the disclosed bi-level decomposable VAEs may be fit to the nonlinear ICA framework. For component k, suppose the distribution regarding $h_k$ is a factorial member of the exponential family with m sufficient statistics, conditioned on $u_k$. Here $u_k$ is additional observed variable. In one or more embodiments, the general form of the distribution may be written as:

$$p_{h_k}(h_k | u_k) = \prod_{i=1}^{l} \frac{Q_i(h_{k,i})}{Z_i(u_k)} \exp\left[\sum_{j=1}^{m} T_{i,j}(h_{k,i}) \lambda_{i,j}(u_k)\right] \quad (9)$$

Here $Q_i$ is the base measure, $Z_i$ is the normalizing constant, $T_{i,j}$ are the components of the sufficient statistic, and $\lambda_{i,j}$ are the corresponding parameters, depending on $u_k$. The variable $y_k$ is the output of an arbitrarily complex, inevitable, and deterministic transformation from the latent space to the data space, i.e., $y_k = f_k^{-1}(h_k)$. Let $T = [T_1, \ldots, T_l]$, $\lambda = [\lambda_1, \ldots, \lambda_l]$, and $\Theta = \{\theta := (T, \lambda, f_k^{-1})\}$, with parameter $\theta = (T, \lambda, f_k^{-1})$, the following equation may be obtained:

$$p_\theta(y_k, h_k | u_k) = \log p_{f^{-1}}(y_k | h_k) p_{T,\lambda}(h_k | u_k). \quad (10)$$

In one or more embodiments, the set of parameters $\hat{\Theta}$ may be obtained with some learning algorithm, i.e., $\hat{\Theta} = \{\hat{\theta} := (\hat{T}, \hat{\lambda}, g_k)\}$. Using $g_k$ to represent the learned approximation of $f_k^{-1}$, and $y_k = g_k(h_k)$, the following equivalence relations on $\Theta$ may be defined.

Definition 1. Let ~ be the equivalence relation on $\hat{\Theta}$. Equation (10) is identifiable up to ~ if $$p(y_k, \Theta) = P(y_k, \hat{\Theta}) \Rightarrow \Theta \sim \hat{\Theta}.$$

The elements of the quotient space $\Theta/\sim$ are called the 180 identifiability classes.

Definition 2. Let ~ be the binary relation on $\hat{\Theta}$ defined by:

$$(T, \lambda, f_k^{-1}) \sim (\hat{T}, \hat{\lambda}, g_k) \Leftrightarrow \exists A, c | T(f_k(y_k)) + c, \forall y_k \in \mathcal{Y}_k,$$

where A is an lm×lm matrix and c is a vector of size lm.

If A is invertible, the above relation is denoted by $\sim_A$.

In one or more embodiments, explicit additional observable variable $u_k$ for component k may not be available. However, K–1 signals from other components relate to it may be available. Assuming the relations involving component k may be fully recovered and sufficient label support from other components may be obtained, the model is identifiable. In one or more embodiments, $y_{-k}$ is used to represent components other than component k, and $u_k(y_{-k})$ is the additional variable recovered from the relations with other components. In the limit of infinite data and good convergence, the estimating model may give the same conditional likelihood to all data points as the true generating model:

$$p_{T,\lambda,f_k^{-1}}(y_k | u_k(y_{-k})) = p_{\hat{T},\hat{\lambda},g_k}(y_k | u_k(y_{-k})) \quad (11)$$

In one or more embodiments, the domain of $f_k^{-1}$ is defined as $\mathcal{H} = \mathcal{H}_1 \times \ldots \times \mathcal{H}_l$. The follow theorem regarding the identifiability of the model may be obtained.

Theorem 1. Assuming data distributed are observed according to the generative model given by equations (7) and (8), and with the following assumptions, (a) The sufficient statistics $T_{i,j}(h)$ are differentiable almost everywhere and their derivatives $$\frac{dT_{i,j}}{dh}$$

are nonzero almost surely for all $h \in \mathcal{H}_i$ and all $1 \leq i \leq l$ and $1 \leq j \leq m$;

(b) The relations involving component k can be approximately fully recovered and can be represented with $u_k(y_{-k})$; and (c) There exist lm+1 distinct conditions $u_k^{(0)}, \ldots, u_k^{(lm)}$ from $y_{-k}$ such that the matrix $L = [\lambda(u_k^{(1)}) - \lambda(u_k^{(0)}), \ldots, \lambda(u_k^{(lm)}) - \lambda(u_k^{(0)})]$ of size lm×lm is inventible;

Then the model parameters $(T, \lambda, f_k^{-1})$ are $\sim_A$ identifiable.

The proof of Theorem 1 and analysis are shown below. Real-world datasets are usually more complicated with non-stationary component locations. The present patent disclosure disclosed embodiments of a bi-level latent model that integrates the aggregation prior model, attention mechanism, and component segmentation for improved flexibility.

Proof of Theorem 1: The conditional probabilities of $p_{T,X,f_k^{-1}}(y_k | u_k(y_{-k}))$ and $p_{\hat{T},\hat{X},g_k}(y_k | u_k(y_{-k}))$ are assumed to be the same in the limit of infinity data. By expanding two pdfs with change of variable rule, the following equation may be obtained:

$$\log \, p_{T,\lambda}(y_k | u_k) + \log|\det \, J_f(y_k)| = \log \, p_{\hat{T},\hat{\lambda}}(h_k | u_k) + \log|\det \, J_{g^{-1}}(y_k)| \quad (12)$$

Different from approaches using observed auxiliary variables as conditional variables, it is assumed that the relations with component k may be recovered and signals from other components may be used as conditional labels. Using $u_k^{(0)}, \ldots, u_k^{(lm)}$ from conditions (b) and (c), $u_k^{(0)}$ is subtracted from this expression to obtain some condition $u_k^{(t)}$, and with the Jacobian terms removed since they do not depend on $u_k$, the following equation may be obtained:

$$\log p_{h_k}(h_k|u_k^{(t)})\log p_{h_k}(h_k|u_k^{(0)})=\log p_{h_k'}(h_k'|u_k^{(t)})-\log p_{h_k'}(h_k'|u_k^{(0)}) \quad (13)$$

In equation (11), both conditional distributions of $h_k$ given $u_k$ belong to exponential family. Eq. (11) may be rewritten as:

$$\sum_{i=1}^{l}\left[\log\frac{Z_i(u_k^{(0)})}{Z_i(u_k^{(t)})}+\sum_{j=1}^{m}T_{i,j}(h_k)(\lambda_{i,j}(u_k^{(t)})-\lambda_{i,j}(u_k^{(0)}))\right]= \quad (14)$$

$$\sum_{i=1}^{l}\left[\log\frac{\hat{Z}_i(u_k^{(0)})}{\hat{Z}_i(u_k^{(t)})}+\sum_{j=1}^{m}\hat{T}_{i,j}(h_k)(\hat{\lambda}_{i,j}(u_k^{(t)})-\hat{\lambda}_{i,j}(u_k^{(0)}))\right]$$

Here the base measures $Q_i$ are cancelled out as they do not depend on $u_k$. Equation (12) may be rewritten with inner products as:

$$\langle T(h_k), \bar{\lambda}\rangle+\sum_i\log\frac{Z_i(u_k^{(0)})}{Z_i(u_k^{(t)})}=\langle\hat{T}(h_k'), \bar{\hat{\lambda}}\rangle+\sum_i\log\left(\frac{\hat{Z}_i(u_k^{(0)})}{\hat{Z}_i(u_k^{(t)})}\right), \quad (15)$$

$$\forall \leq l \leq lm$$

With lm equations combined together, equation (15) may be rewritten in a matrix equation form as following:

$$L^\tau T(h_k)=\hat{L}^\tau \hat{T}(h_k')+b \quad (16)$$

Here $b_t = \sum_i \log\frac{\hat{z}_i(u_k^{(0)})Z_i(u_k^{(t)})}{\hat{z}_i(u_k^{(t)})Z_i(u_k^{(0)})}$.

By multiplying inverse of $L^\tau$ to both size of equation (16), the following equation may be obtained:

$$T(h_k)=A\hat{T}(h_k')+c \quad (17)$$

Here $A=L^{-1\tau}\hat{L}^\tau$ and $c=L^{-1\tau}b$. There may exist m distinct values $h_{k,i}^1$ to $h_{k,i}^m$ such that $$\left[\frac{dT_i}{dh_{k,i}}(h_{k,i}^1), \ldots, \frac{dT_i}{dh_{k,i}}(h_{k,i}^m)\right]$$

are linear independent in $\mathbb{R}^m$, for all $1\leq i\leq l$. By defining m vectors $h_k^t=[h_{k,1}^t, \ldots, h_{k,l}^t]$ from multiple points, the Jacobian $Q=[J_T(h_k^1), \ldots, J_T(h_k^m)]$ may be obtained with each entry as Jacobian with size lm×l from the derivative of equation (17) regarding these m vectors. Hence Q is an lm×lm invertible and the fact that each component of T is univariate. In one or more embodiments, a corresponding matrix $\hat{Q}$ with the Jabocian computed at the same points may be constructed and the following equation may be obtained:

$$Q=A\hat{Q} \quad (18)$$

Here $\hat{Q}$ and A are both full rank as Q is full rank.

2. Embodiments of Bi-Level Latent Structure

In this subsection, embodiments of a generative model that may identify the hierarchy of components in a dataset are disclosed. The generative model uses a generator that maps latent space $\mathbb{Z}$ to a manifold $\mathbb{X}$ embedded in the sample input space. It is assumed that there are K conditional independent components for the samples of a dataset. $x=x_1\ldots x_K$ is the output variable of the generator, and $z=z_0z_1\ldots z_K$ is the latent variable of the generator, wherein $x_k$ is the variable for kth component, $z_0$ controls the global properties of each sample of x across all components, and $z_k$ controls the properties of component k that are independent from the other components and $z_0$. In one or more embodiments, it is assumed the components are conditional independent from each other given the latent variable, i.e., $x_i \perp x_k|z$, if $i\neq k$. In one or more embodiments, it is also independently assumed about the components and latent variables, $x_i \perp z_k|z_0$, if $i\neq k$. With these two assumptions, the distribution of the generated samples may be shown as:

$$p(x_1x_2\ldots x_K|z) = p(x_1x_2\ldots x_K|z_0z_1\ldots z_K) = \quad (19)$$

$$\prod_{k=1}^{K}p(x_k|z_0z_1\ldots z_K) = \prod_{k=1}^{K}p(x_k|z_0z_k)$$

Figure 2:
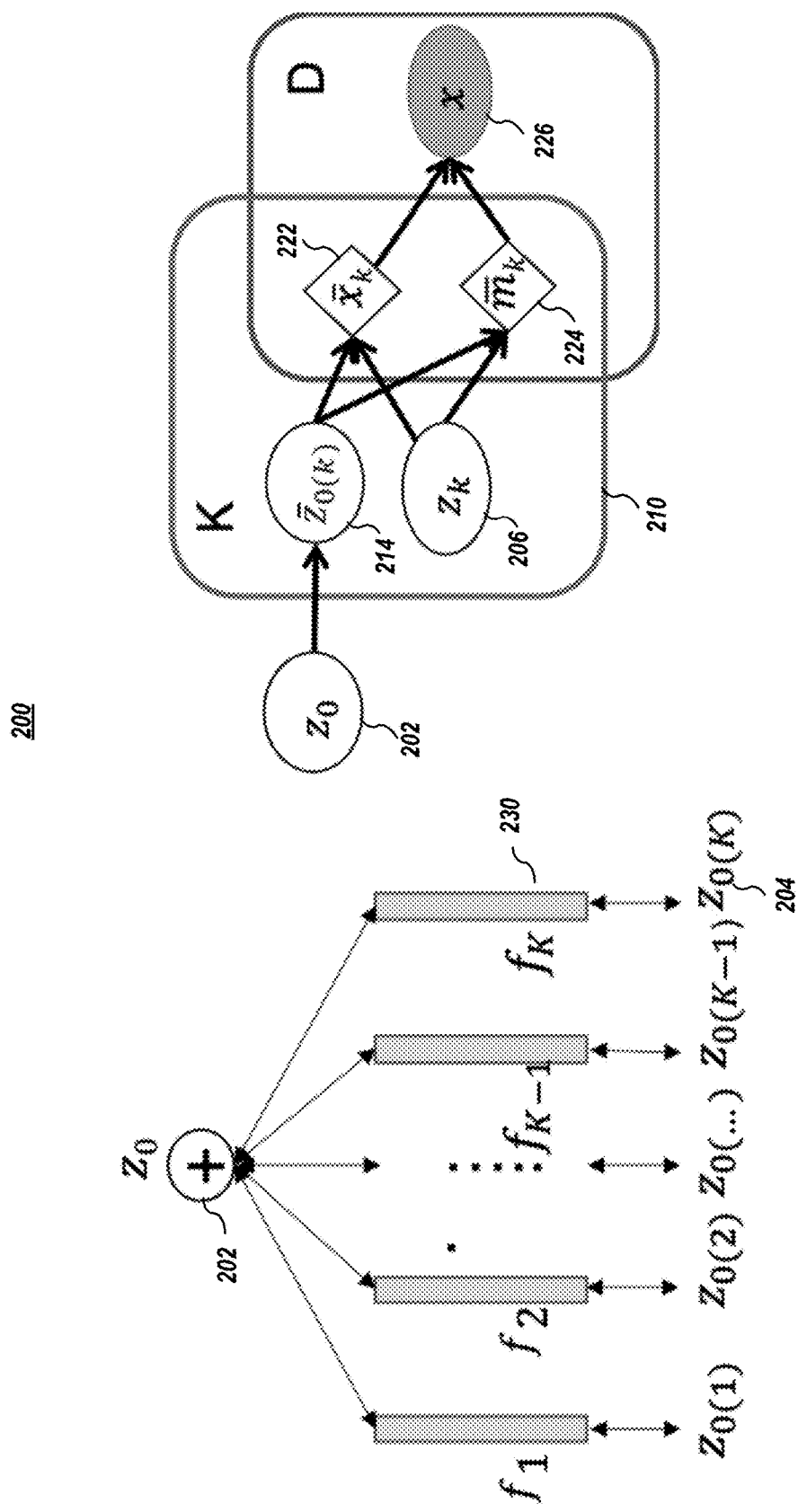
FIG. 2 depicts a hierarchy structure for latent variables, according to embodiments of the present disclosure.

In one or more embodiments, a hierarchy structure is employed for the latent variables. FIG. 2 depicts a structure for latent variables, according to embodiments of the present disclosure. For component k, the corresponding latent variable is $z_k'=z_kz_{0(k)}$. As shown in the left part of FIG. 2, each $z_{0(k)}$ 204 links to the global latent variable $z_0$ 202 with the message passing prior via an invertible function $f_k$ 230. As shown in the right part of FIG. 2, $z_0$ 202 is the shared latent variable of K components 210. The deterministic pixel-wise means and masks are denoted as $\bar{x}$ and $\bar{m}$ respectively. D is the dimensionality of the input data samples. In one or more embodiments, a reconstructed component $\bar{x}_k$ 222 and reconstructed mask $\bar{m}_k$ 224 may be generated based on the $\bar{z}_{0(k)}$ 214 (which is decoded from the global latent variable $z_0$ 202) and $z_k$ 206. A reconstructed output 226 may be generated based on reconstructed component $\bar{x}_k$ 222 and reconstructed mask $\bar{m}_k$ 224.

As shown in FIG. 2, K, $z_1', \ldots, z_K'$ are the first layer latent representations with each $z_k'=z_kz_{0(k)}$, and $z_0$ the second layer latent representations. In one or more embodiments. $z_0$ encodes the global properties of the generated samples, and the correlations or interactions between different components as well. In one or more embodiments, $z_{0(k)}$ 204 is used to denote the global information decoded from $z_0$ regarding component k. By concatenating $z_{0(k)}$ and $z_k$ that controls the specific properties of component k, $z_k'$ contains all the latent information of component k. In an illustration example, a human face is used with different components representing different parts of the face, such as eyes, hair, facial skin, mouth, etc. The common latent factor $z_0$ includes factors such as age or emotion that controls overall appearance of the face. In one or more embodiments of the present patent disclosure, a framework is developed to encode each component's individual features as well as the global latent factors for the whole scene.

3. Network Framework Embodiments

Embodiments of a framework are disclosed to encode and decode each component and capture the global latent factor as well. In one or more embodiments, a single VAE framework may be used for encoding and decoding of all components. For each component, the latent vector $z_k'$ contents two sections, i.e., $z_k'=z_k z_{0(k)}$. $z_k$ is used for component k's local latent features, and $z_{0(k)}$ is for the features of component k controlled by global latent factor $z_0$.

Figure 3:
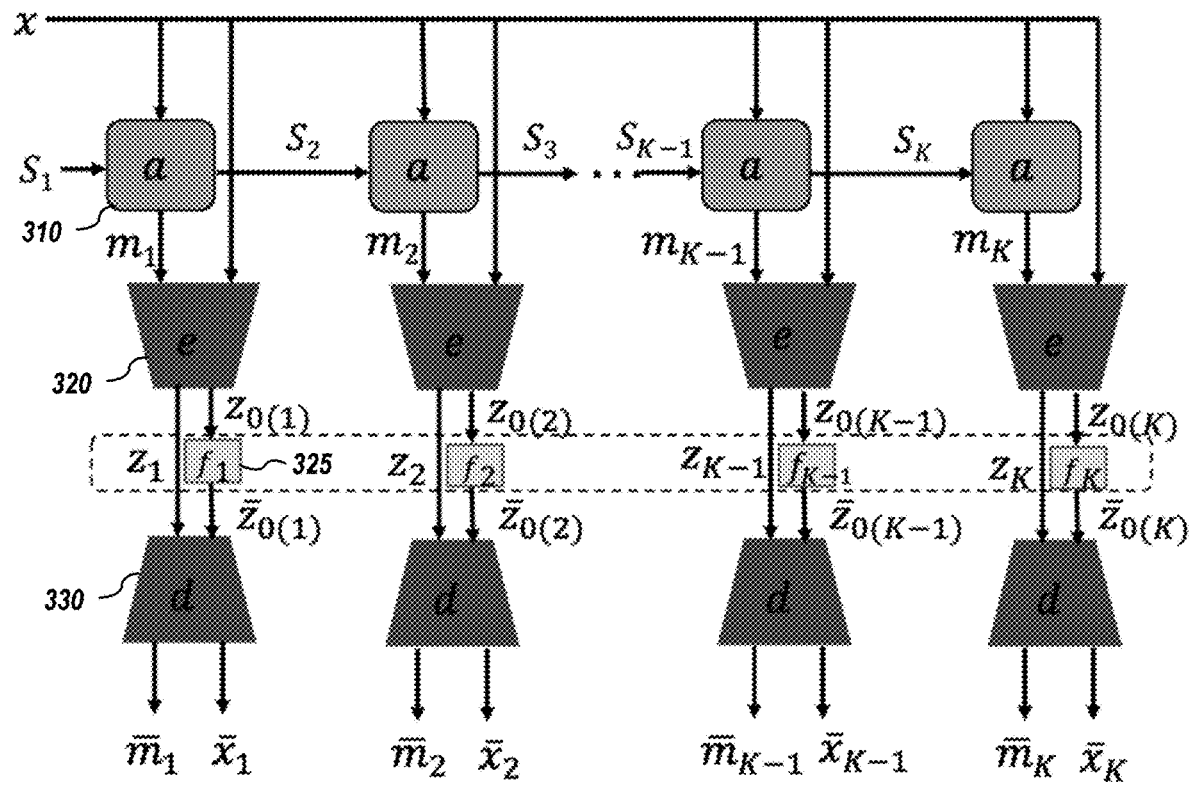
FIG. 3 depicts a framework of a generative hierarchical model, according to embodiments of the present disclosure.

FIG. 3 depicts a framework of a generative hierarchical model 300, according to embodiments of the present disclosure. The generative hierarchical model 300 comprises a specific network employed as an attention network a for component segmentation. As shown in FIG. 3, a is the attention network 310, e is an encoder 320, d is a decoder 330, and $f_k$ is the flow inference network 325 for component k. $(x, m_k)$ and $(z_k, z_{0(k)})$ are the kth component input and output of the encoder 320. $(z_k, \bar{z}_{0(k)})$ and $(\bar{x}_k, \bar{m}_k)$ are the input and output of the decoder 330. In one or more embodiments, the input scope for kth component may be defined as $s_k = s_{k-1} \circ (1-m_{k-1})$.

Figure 4:
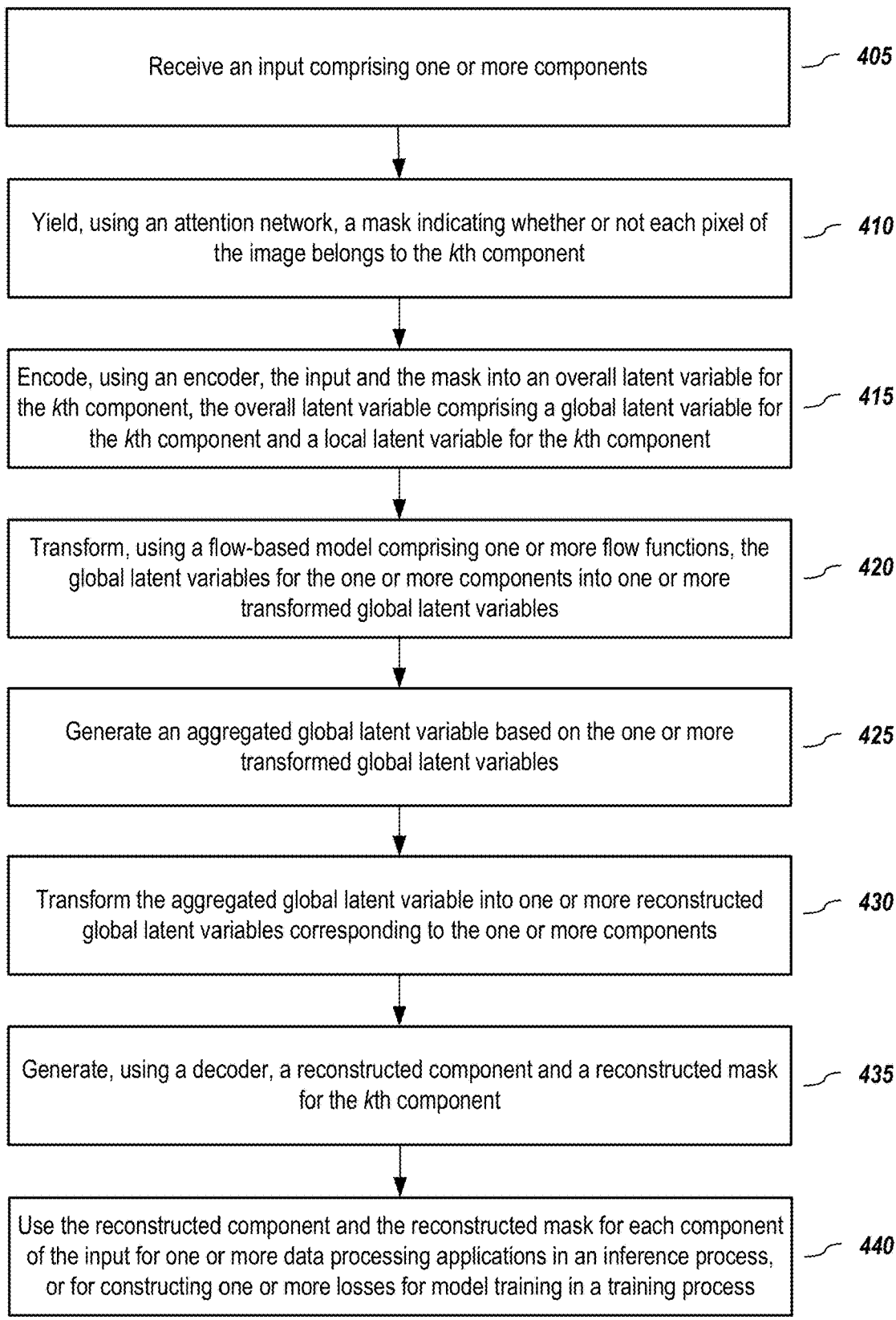
FIG. 4 depicts a process for encoding and decoding of all components, according to embodiments of the present disclosure.

FIG. 4 depicts a process for encoding and decoding of components shown in FIG. 4, according to embodiments of the present disclosure. An input x comprising K (K≥1) components is received (405) as an input for the model. The input may be an image with components representing objects in the image, or a data sample with component representing different portions in a data sample. In component k, with the input x and scope $s_k$ as the input, the attention network a yields (410) a mask $m_k$ to indicate probabilities of at least a subset of elements of the input x belonging to each of the one or more components. The elements of the input may be referred as pixels of an image (when the input is an image) or data points of a data sample (when the input is a data sample). In one or more embodiments, the probabilities are binary values to indicate whether each pixel of x belongs to each component or not. Here $s_k$ is the attention leftover from components 1 to k−1, i.e., $s_k = \overline{\cup_{i=1}^{k-1} m_i}$, and $s_1=1$. In one or more embodiments, the masks corresponding to the one or more components are generated sequentially, e.g., the scope for component k may be calculated based on a scope and a mask from a previous component, e.g., $s_k = s_{k-1} \circ (1-m_{k-1})$ and $\Sigma_{k=1}^{K} m_k = 1$, $m_k = 1$. Here $\circ$ means element-wise multiplication.

The encoder e encodes (415) the input and the mask for the kth component $(x, m_k)$ into an overall latent variables for the kth component $z_k'$ ($z_k' = z_k z_{0(k)}$). $z_k$ is used for component k's local latent features, and $z_{0(k)}$ is for the features of component k controlled by global latent factor $z_0$. In one or more embodiments of the present disclosure, different from MONet that uses just one layer of latent variables, a flow-based model comprising one or more flow functions ($f=\{f_1, \ldots, f_k\}$) is used as a second layer auto-encoder to transform (420) all global latent variables $z_{0(k)}$, k=1, ... K, into transformed global transformed global latent variable ($f_k(z_{0(k)})$), k=1, ... K. An aggregated global latent variable ($z_0$) is then generated (425) based on the one or more transformed global latent variables. The aggregated global latent variable $z_0$ is transformed (430), using the flow-based model, back into one or more reconstructed global latent variables ($\bar{z}_{0(1)}, \bar{z}_{0(2)} \ldots$) corresponding to the one or more components. Each ($z_k, \bar{z}_{0(k)}$) is fed to the decoder d to generate (435) a reconstructed kth component $\bar{x}_k$ and a reconstructed mask (e.g., the reconstructed pixel assignment label) $\bar{m}_k$, which is the reconstruction of $m_k$. In one or more embodiments, $\bar{m}_k$ is the predicted label assignment based on the latent factors ($z_k, \bar{z}_{0(k)}$). In one or more embodiments, the output ($\bar{x}_k, \bar{m}_k$) of the decoder may be used (440) for one or more data processing applications (e.g., digital image processing, etc.) in an inference process, or for constructing one or more losses for training in a training process.

In one or more embodiments, the message passing prior may curb the model's degree of freedom and may capture the interaction between different segments or components as well. The aggregation prior model shown in FIG. 1 may be applied as the flow-based model in FIG. 3 for global latent variable encoding and decoding, according to embodiments of the present disclosure. As shown in FIG. 3, $[z_{0(1)}, \ldots, z_{0(K)}]$ is used as input to the flow-based model. The global latent variable $z_0$ 410 may be inferred with forward message passing (encoding). With backward message passing (decoding), $\check{z}_0 = [\bar{z}_{0(1)}, \bar{z}_{0(2)}, \ldots, \bar{z}_{0(k)}]$, $\bar{z}_{0(k)} = f_k^{-1}(z_0)$ may be obtained. Here $\bar{z}_{0(k)}$ is a reconstructed global latent variable for component k.

Figure 5:
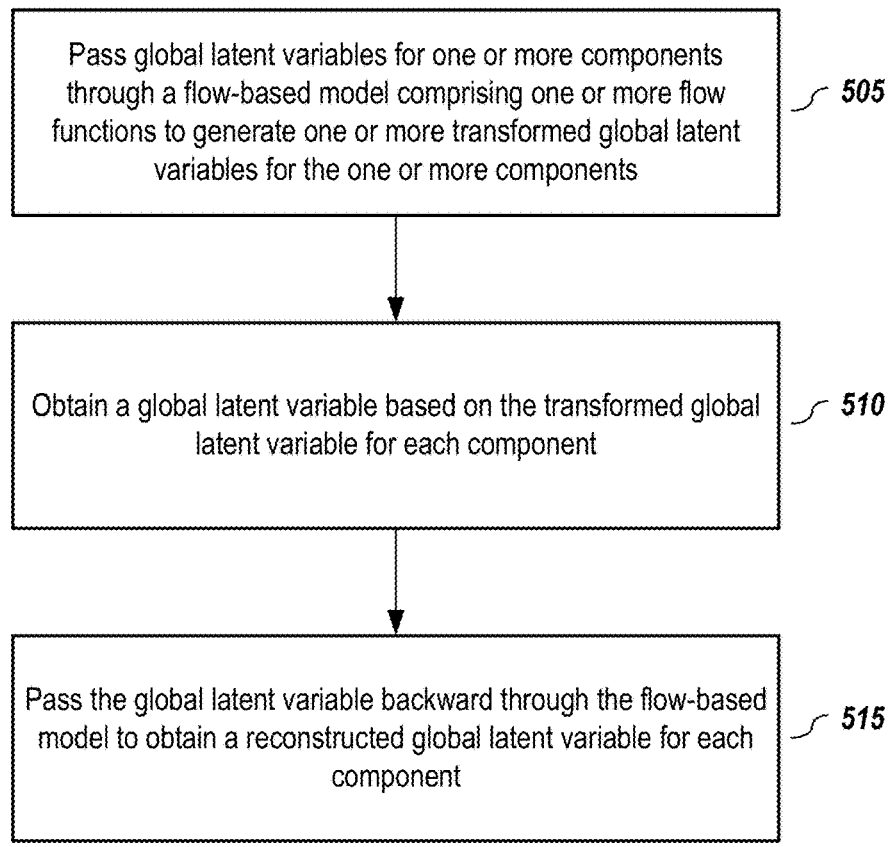
FIG. 5 depicts a process for global latent variable encoding and decoding, according to embodiments of the present disclosure.

FIG. 5 depicts a process for global latent variable encoding and decoding using the flow-based model, according to embodiments of the present disclosure. One or more global latent variables $z_{0(k)}$ for component k, k=1, ... ,K are passed (505) through a flow-based model comprising one or more flow functions to generate one or more transformed global latent variables $f_k(z_{0(k)})$, k=1, ... , K. In one or more embodiments, the one or more flow functions are invertible functions. Each of the one or more flow functions applies a transformation for a global latent variable for one component to generate a corresponding reconstructed global latent variable for the component. A global latent variable $z_0$ (also referred as an aggregated global latent variable) may be obtained (510) based on the transformed global latent variable $f_k(z_{0(k)})$ for each component. In one or more embodiments, the global latent variable $z_0$ is an average of the transformed global latent variables $f_k(z_{0(k)})$ for all component, e.g., $$z_0 = \frac{1}{K} \sum_{k=1}^{K} f_k(z_{0(k)}).$$

The global latent variable $z_0$ is passed (515) backward through the flow-based model to obtain a reconstructed global latent variable $\bar{z}_{0(k)}$ for each component. In one or more embodiments, the flow function $f_k$ applies an inverse transformation ($f_k^{-1}$) to the global latent variable $z_0$ to obtain the corresponding reconstructed global latent variable $\bar{z}_{0(k)} = f_k^{-1}(z_0)$ for component k.

In one or more embodiments, the relation between global latent variable $z_0$ and global latent variable for each component $z_{0(k)}$, k=1, ..., K is taken as the encoding (with $f=\{f_1, \ldots, f_k\}$) and decoding (with $f_k^{-1}$) procedure. With the flow-based model as both encoder and decoder for the second layer of latent variable, the model's degree of freedom may be curbed and interactions between different segments or components may be captured. With $\hat{z}_0 = [z_{0(1)}, z_{0(2)}, \ldots, z_{0(K)}]$, $z_0$ encodes $\hat{z}_0$ by aggregating outputs of all invertible functions $f_k$, i.e., $$z_0 = f(\hat{z}_0) = \frac{1}{K} \sum_{k=1}^{K} f_k(z_{0(k)}).$$

With $\bar{z}_{0(x)}$ as the output of the decoder $f_k^{-1}(z_{0(k)})$, $\bar{z}_{0(k)}$ may be expressed as $\bar{z}_{0(k)} = f_k^{-1}(z_0)$.

4. ELBO of the Bi-Level Latent Model Embodiments

In one or more embodiments, to derive the ELBO, a bi-level variational autoencoder (VAE) with simplified notations is used as a start. Afterwards, derivations to the model are extended. For the kth component, the latent variable of its first layer has two sections, $z_k$ and $z_{0(k)}$. Only $z_{0(k)}$ connects to layer 2, $z_0$. Therefor the ELBO has two components regarding these two different latent parts. In one or more embodiments, with $(x, m_k)$ as the kth component's input for the encoder, $(z_k, z_{0(k)})$ as the first layer latent variable, $z_0$ as the second layer variable, $z_{0(k)}$ and $(\bar{x}_k, \bar{m}_k)$ as the reconstructions, the ELBO for the bi-level VAE may be given by the following theorem.

Theorem 2. Let $\mathcal{L}_k (X, m_k; a, e, d, f)$ be the ELBO regarding component k in the bi-level segmentation VAW model, then:

$$\log p(x, m_k) \geq \mathcal{L}_k(x, m_k; a, e, d, f) = \quad (20)$$
$$\mathbb{E}_{q_e(z_k, z_{0(k)}|x, m_k)}[\log p_d(z_k, z_{0(k)} | x, m_k)] -$$
$$KL(q_e(z_k | x, m_k) \| p(z_k)) + H(z_{0(k)} | x, m_k) +$$
$$\mathbb{E}_{q_f(z_0|z_{0(k)})}[\log p_{f_k}(z_{0(k)} | z_0)] - KL(q_f(z_0 | z_{0(k)}) \| p(z_0))$$

The derivation of the ELBO is given in subsection a) Derivation of the ELBO below. Here a, e, d, $f_k$ are the attention, encoder, decoder, and flow function for component k, respectively. In one or more embodiments, the reconstruction term regarding x and $m_k$ in the above ELBO (18) may be given as $\Phi_k = \mathbb{E}_{q_e(z_k, z_{0(k)}|x, m_k)}[\log p_d(x, m_k|z_k, z_{0(k)})]$. In one or more embodiments, the reconstruction loss for the data sample x is weighted by the attention masks ($m_k$). In one or more embodiments, the entries of the masks ($m_k$) follow Bernoulli distribution parameterized with Sigmoid functions. In one or more embodiments, the reconstruction loss regarding the masks (the second term in equation (21) for $\Phi_k$) is tractable based on the assumption that the KL divergence between outputs from two neural networks (a and d) may be used. In one or more embodiments, the reconstruction term for both x and $m_k$ may be rewritten as:

$$\Phi_k = \mathbb{E}_{q_e(z_k, z_{0(k)}|x, m_k)}[m_k \log p_d(x|z_k, z_{0(k)})] - KL(q_a(m_k|x) \| p_d(\bar{m}_k|z_k, z_{0(k)})) \quad (21)$$

In one or more embodiments, the regularization terms for the first layer's latent variable are given by $$\Psi_k = -KL(q_e(z_k|x, m_k) \| p(z_k)) + H(z_{0(k)}|x, m_k) \quad (22)$$

In one or more embodiments, all the latent variables are assumed to follow Gaussian distributions. Both the KL and entropy terms may be computed with reparameterization. Improved disentanglement may be achieved with total correlation (TC) for component local representation regarding the KL term in equation (22). In one or more embodiments, the objective function across all components for maximization may be given by:

$$\mathcal{L}(x; a, e, d, f) = \sum_{k=1}^{K} \mathcal{L}_k(x, m_k; a, e, d, f) \quad (23)$$

a) Derivation of the ELBO

In one or more embodiments of the present disclosure, a bi-level VAE enhanced with a recurrent attention mechanism is disclosed. The ELBO of the model may be optimized. As shown in FIG. 3, the attention network generates mask $m_k$ for component k. The input for the encoder e is [$x_k$, $m_k$], and the corresponding reconstruction generated from the decoder d is [$\bar{x}_k$, $\bar{m}_k$]. $z_k' = z_k z_{0(k)}$ is the overall latent variable for component k. More details about the notations may be found in Table 1.

Proof of Theorem 2: in the bi-level auto-encoder, $(x, m_k)$ is the first layer's input, and $(z_k, z_{0(k)})$ is the first layer's latent variable. Meanwhile, $z_{0(k)}$ is also the second layer's input, and $z_0$ is the second layer's latent variable. $(\bar{x}, \bar{m}_k)$ and $\bar{z}_{0(k)}$ are the reconstructions regarding the first and second inputs, respectively. The second layer posterior distribution for $z_0$ is $q_f(z_0|z_{0(1)} z_{0(2)} z_{0(K)})$.

Derivation of the ELBO starts with a bi-level VAE with simplified notations. The derivation is extended to embodiments of the model. In one or more embodiments, $z^l$, $l \in \{1, 2\}$ is used to represent the latent variable in layer l. Let $z = \{z^1, z^2\}$, the following equation may be obtained:

$$\log p(x) = \mathbb{E}_{q(z|x)}\left[\log \frac{p(x, z)}{p(z|x)}\right] = \mathbb{E}_{q(z|x)}\left[\log \frac{p(x, z)}{q(z|x)} \frac{q(x, z)}{p(z|x)}\right] = \quad (24)$$
$$\mathbb{E}_{q(z|x)}\left[\log \frac{p(x, z)}{q(z|x)}\right] + \mathbb{E}_{q(z|x)}\left[\log \frac{q(x, z)}{p(z|x)}\right] \geq \mathbb{E}_{q(z|x)}\left[\log \frac{p(x, z)}{q(z|x)}\right] =$$
$$\mathbb{E}_{q(z^{1,2}|x)}\left[\log \frac{p(x|z^{1,2}) p(z^{1,2})}{q(z^{1,2}|x)}\right] =$$
$$\mathbb{E}_{q(z^{1,2}|x)}[\log p(x|z^{1,2})] + \mathbb{E}_{q(z^{1,2}|x)}\left[\log \frac{p(z^{1,2})}{q(z^{1,2}|x)}\right] =$$
$$\mathbb{E}_{q(z^{1,2}|x)}[\log p(x|z^1)] + \mathbb{E}_{q(z^{1,2}|x)}\left[\log \frac{p(z^{1,2})}{q(z^{1,2}|x)}\right] =$$
$$\mathbb{E}_{q(z^1|x)}[\log p(x|z^1)] + \mathbb{E}_{q(z^{1,2}|x)}\left[\log \frac{p(z^{1,2})}{q(z^{1,2}|x)}\right]$$

In one or more embodiments, the second term in equation above may be extended as follows.

$$\mathbb{E}_{q(z^{1,2}|x)}\left[\log \frac{p(z^{1,2})}{q(z^{1,2}|x)}\right] = \mathbb{E}_{q(z^{1,2}|x)}\left[\log \frac{p(z^1|z^2) p(z^2)}{q(z^1|x) q(z^2|z^1)}\right] = \quad (25)$$
$$\mathbb{E}_{q(z^{1,2}|x)}\left[\log \frac{p(z^1|z^2) p(z^2)}{q(z^2|z^1)}\right] + \mathbb{E}_{q(z^{1,2}|x)}\left[\log \frac{1}{q(z^1|x)}\right] =$$
$$\mathbb{E}_{q(z^2|z^1)}\left[\log \frac{p(z^1|z^2) p(z^2)}{q(z^2|z^1)}\right] + \mathbb{E}_{q(z^{1,2}|x)}\left[\log \frac{1}{q(z^1|x)}\right] =$$
$$\mathbb{E}_{q(z^2|z^1)}\left[\log \frac{p(z^1|z^2) p(z^2)}{q(z^2|z^1)}\right] + \mathbb{E}_{q(z^1|x)}\left[\log \frac{1}{q(z^1|x)}\right] =$$
$$\mathbb{E}_{q(z^2|z^1)}[\log p(z^1|z^2)] + \mathbb{E}_{q(z^2|z^1)}\left[\log \frac{p(z^2)}{q(z^2|z^1)}\right] + H(z^1|x) =$$
$$\mathbb{E}_{q(z^2|z^1)}[\log p(z^1|z^2)] + H(z^1|x) + \mathbb{E}_{q(z^2|z^1)}\left[\log \frac{p(z^2)}{q(z^2|z^1)}\right] =$$
$$H(z^1|x) + \mathbb{E}_{q(z^2|z^1)}[\log p(z^1|z^2)] - KL(q(z^2|z^1) \| p(z^2))$$

Accordingly, the EBLO may be written as:

$$\log p(x) \geq \mathbb{E}_{q(z^1|x)}[\log p(x|z^1)] + H(z^1|x) + \mathbb{E}_{q(z^2|z^1)}[\log p(z^1|z^2)] KL(q(z^2|z^1) \| p(z^2))$$

In one or more embodiments, for the kth component, the latent variable of its first layer has two sections, $z_k$ and $z_{0(k)}$. Only $z_{0(k)}$ connects to layer 2 ($z_0$). Therefor the ELBO has two components regarding these two different latent parts, $$\log p(x) \geq \mathbb{E}_{q_e(z_k z_{0(k)}|x, m_k)}[\log p_d(x, m_k|z_k, z_{0(k)})] - KL(q_e(z_k|x, m_k) \| p(z_k)) + H(z_{0(k)}|x, m_k) + \mathbb{E}_{q_f(z_0|z_{0(k)})}[\log p_{f_k}(z_{0(k)}|z_0)] - KL(q_f(z_0|z_{0(k)}) \| p(z_0)) \quad (26)$$

Here $q_e$ is the posterior distribution for the first layer latent variable parameterized by the encoder e. $p_d$ is the distribution for x and $m_k$ parameterized with the decoder d. $f_k$ is the k's flow-based model, and $f=\{f_1, \ldots, f_K\}$. The conditional distribution $q_f(z_0|z_{0(k)})$ captures the relationship between $z_{0(k)}$ and the other $z_{0(j)}$, $j\neq k$. In one or more embodiments, all the latent variables are assumed to follow Gaussian distribution. In one or more embodiments, the variance value of posterior $q_f(z_0|z_{0(1)}z_{0(2)}\ldots z_{0(K)})$ is set to a fixed value 1.

5. Inference of the Global Latent Variable Embodiments

In one or more embodiments, for component k, the terms in the ELBO of equation (20) regarding the second layer of latent variable $z_0$ may be given by:

$$\mathcal{L}_{f_k} \mathbb{E}_{q_f(z_0|z_{0(k)})}[\log p_{f_k}(z_{0(k)}|z_0)] - KL(q_f(z_0|z_{0(k)})\|p(z_0))) \quad (27)$$

It may be seen that the computation of $\mathcal{L}_{f_k}$'s values involves both encoding ($q_f(z_0|z_{0(k)})$) and decoding ($p_{f_k}(z_{0(k)}|z_0)$) procedures. The first term of $\mathcal{L}_{f_k}$ is to compute the conditional log-likelihood value of $z_{0(k)}$ given $z_0$. The learning of all $f_k$ is the same as the learning of the encoder and decoder in a standard VAE model. In one or more embodiments, the prior $p(z_0)$ is standard normal distributions. To compute the KL divergence, the empirical variance and mean from the samples of $q_f(z_0|z_{0(k)})$ may be used. In one or more embodiments, the global latent variable's value may be inferred from any subset of components, e.g., $z_0 = f(\hat{z}_0) = f_k(z_{0(k)}) = f_j(z_{0(j)})$, $\forall k \neq j$. The value of $\|f_k(z_{0(k)}) - z_0\|^2$ of each k may be penalized to achieve it. Following equation (3), the objective $\mathcal{L}_{f_k}$ may be finalized as:

$$\mathcal{L}_{f_k} = -\frac{1}{2\sigma^2}\|z_{0(k)} - f_k^{-1}(z_0)\|^2 - \frac{1}{2\sigma^2}\|z_0 - f_k(z_{0(k)})\|^2 - KL(q_f(z_0|z_{0(k)})\|p(z_0)) + C_k \quad (28)$$

Here $C_k$ is a constant value. The KL term can be calculated with disclosure regarding equation (2).

6. Causal Direction Embodiments

Section 5 above discloses using a learned aggregation prior model to infer relation between two components. By maximizing the objective (ELBO) of the auto-encoder in the second layer, equation (28) for the objective $\mathcal{L}_{f_k}$ may be obtained. In one or more embodiments, maximizing this objective may enforce each component to have the same latent value, i.e., $z_0 = f_1(z_{0(1)}) = \ldots = f_K(z_{0(K)})$. In one or more embodiments, $z_{0(i)}$ and $z_{0(j)}$ may be used to infer the causal interaction between component i and j. The value of $z_{0(j)}$ may be predicted with $z_{0(i)}$ via $f_j^{-1}(f_i(z_{0(i)}))$. The value of $z_{0(i)}$ may be predicted with $z_{0(j)}$ via $f_i^{-1}(f_j(z_{0(j)}))$. The variance of prediction error may be used to determine the causal direction by following a Regression Error based Causal Inference (RECI) method.

In one or more embodiments, assuming two data components are a pair of causal and effect variables, the causal relation may be detected by extending a cause-effect inference approach. Given a causal-effect pair $\{c, e\}$ defined by $e_\alpha = \phi(c) + \alpha n$, wherein $\alpha$ is a positive real number and n following noise distribution, expected variance of prediction error may be used to reveal the causal direction based on Theorem 3. In one or more embodiments, the ratio of expected variance of prediction error as the score to reveal the causal direction of a pair of variables by the theory of Theorem 3.

---

Theorem 3.

For a pair of causal and effect variables $\{c, e\}$, $e_\alpha = \phi(c) + \alpha n$, under the assumptions (a)-(d), the limit $\lim_{\alpha \to 0} \frac{\mathbb{E}[\text{Var}[c|e_\alpha]]}{\mathbb{E}[\text{Var}[e_\alpha|c]]} \geq 1$ holds.

(a) $\phi$: $[0,1] \to [0,1]$ is invertible, monotone, and twice differentiable;
(b) compact support;
(c) $\mathbb{E}[n|c] = 0$, $\forall c \in [0,1]$, and $\mathbb{E}[\text{Var}[n|c]] = 1$; and
(d) $\text{Cov}[\phi', \text{Var}[n|c]_{p_c}] = 0$.

---

With a well-trained flow-based model shown in FIG. 2 (left part), the value of $z_{0(k)}$ may be imputed with any $z_{0(j)}$, $j \neq k$ with the encoding and decoding procedure given in previous subsection. In one or more embodiments, the following theorem regarding causal detection may be utilized. Theorem 3 provides an approach to detect the causal relation among components. The proof of Theorem 3 and more details about component interaction detection are described below.

Proof of Theorem 3: For two random variables $\mathcal{B}$ and $\mathcal{G}$ the conditional variance of $\mathcal{B}$, given by g is defined by $\text{Var}[\mathcal{B}|g] := \mathbb{E}[(\mathcal{B}|\mathbb{E}[\mathcal{B}|g])^2|g]$. $\text{Var}[\mathcal{B}|\mathcal{G}]$ is the random variable attaining $\text{Var}[\mathcal{B}|g]$ when $\mathcal{G}$ attains g. Its expectation is given by:

$$\mathbb{E}[\text{Var}[\mathcal{B}|\mathcal{G}]] := \int \text{Var}[\mathcal{B}|g] p_\mathcal{G}(g) dg. \quad (29)$$

For an invertible function h, equations $\text{Var}[h(G)|g] = 0$ and $\text{Var}(\mathcal{B}|h(q)) = \text{Var}(\mathcal{B}|q)$ may be obtained.

In one or more embodiments, it may be observed that $$\mathbb{E}[\text{Var}[e_\alpha|c]] = \mathbb{E}[\text{Var}[\phi(c)+\alpha n|c]] = \alpha^2 \mathbb{E}[\text{Var}[n|c]] = \alpha^2 \quad (30)$$

Accordingly, one may have $$\lim_{\alpha \to 0} \frac{\mathbb{E}[\text{Var}[c|\tilde{e}_\alpha]]}{\mathbb{E}[\text{Var}[\tilde{e}_\alpha|c]]} = \lim_{\alpha \to 0} \int_{\phi(1)-\alpha n_-}^{\phi(1)+\alpha n_+} \text{Var}\left[\frac{\phi^{-1}(e-\alpha n)}{\alpha} \Big| e\right] p_{e_\alpha}(e) de = \quad (31)$$

$$\lim_{\alpha \to 0} \int_{\phi(1)}^{\phi(1)} \text{Var}\left[\frac{\phi^{-1}(e-\alpha n)}{\alpha} \Big| e\right] p_{e_\alpha}(e) de$$

In the latter step of the above equation, $\alpha n_+$ and $\alpha n_-$ vanishes in the limit due to $e \mapsto \text{Var}[\phi^{-1}(e-\alpha n)|e]p_{e_\alpha}(e)$ is uniformly bounded by $\alpha$, and the variance is bounded by 1. $p_{e_\alpha}(e)$ is uniformly bounded. Accordingly, the bounded convergence theorem states that:

$$\lim_{\alpha \to 0} \int_{\phi(1)}^{\phi(1)} \text{Var}\left[\frac{\phi^{-1}(e-\alpha n)}{\alpha} \Big| e\right] p_{e_\alpha}(e) de = \quad (32)$$

$$\int_{\phi(1)}^{\phi(1)} \lim_{\alpha \to 0} \left(\text{Var}\left[\frac{\phi^{-1}(e-\alpha n)}{\alpha} \Big| e\right] p_{e_\alpha}(e)\right) de$$

With Taylor's theorem, one may get:

$$\lim_{\alpha \to 0} \text{Var}\left[\frac{\phi^{-1}(e-\alpha n)}{\alpha} \Big| e\right] = \quad (33)$$

$$\lim_{\alpha \to 0} \text{Var}\left[-n\phi^{-1'}(e) - \frac{1}{2}\alpha n^2 \phi^{-1''}(\bar{E}) \Big| e\right] = \phi^{-1'}(e)^2 \text{Var}(n|e)$$

Here $\bar{E}$ is a value in $[e-\alpha n, e]$. Furthermore, one may have $$\lim_{\alpha \to 0} p_{e_\alpha}(e) = p_{e_0}(e).$$

Thus, one may have $$\lim_{\alpha \to 0} \mathbb{E}\left[\text{Var}\left[\frac{c}{\alpha} \Big| e_\alpha\right]\right] = \quad (34)$$

$$\int_0^1 \phi^{-1'}(e)^2 \text{Var}(n|e) P_{e_0}(e) de = \int_0^1 \frac{1}{\phi'(c)^2} \text{Var}[n|c] P_c(c) dc.$$

The last term in equation (34) may be rewritten as:

$$\int_0^1 \frac{1}{\phi'(c)^2} \text{Var}[n|c] P_c(c) dc = \quad (35)$$

$$\int_0^1 \sqrt{\frac{1}{\phi'(c)^2} \text{Var}[n|c]}^2 P_c(c) dc \cdot \int_0^1 \sqrt{\text{Var}[n|c]}^2 P_c(c) dc \geq$$

$$\left(\int_0^1 \frac{1}{\phi'(c)} \text{Var}[n|c] P_c(c) dc\right)^2$$

Here the inequality above is based on Cauchy Schwartz inequality. If $\phi$ is linear, the last term of the above formula becomes 1, as $\phi'=1$. Alternatively, a statement may be made about equation (35) and thus complete the proof for Theorem 3.

$$\int_0^1 \frac{1}{\phi'(c)^2} \text{Var}[n|c] P_c(c) dc =$$

$$\int_0^1 \sqrt{\frac{1}{\phi'(c)^2} \text{Var}[n|c]}^2 P_c(c) dc \cdot \int_0^1 \sqrt{\text{Var}[n|c]}^2 P_c(c) dc \geq$$

$$\left(\int_0^1 \sqrt{\frac{1}{\phi'(c)^2} \text{Var}[n|c]} \sqrt{\text{Var}[n|c]} P_c(c) dc\right)^2 =$$

$$\left(\int_0^1 \frac{1}{\phi'(c)} \text{Var}[n|c] P_c(c) dc\right)^2 = 1$$

Figure 6:
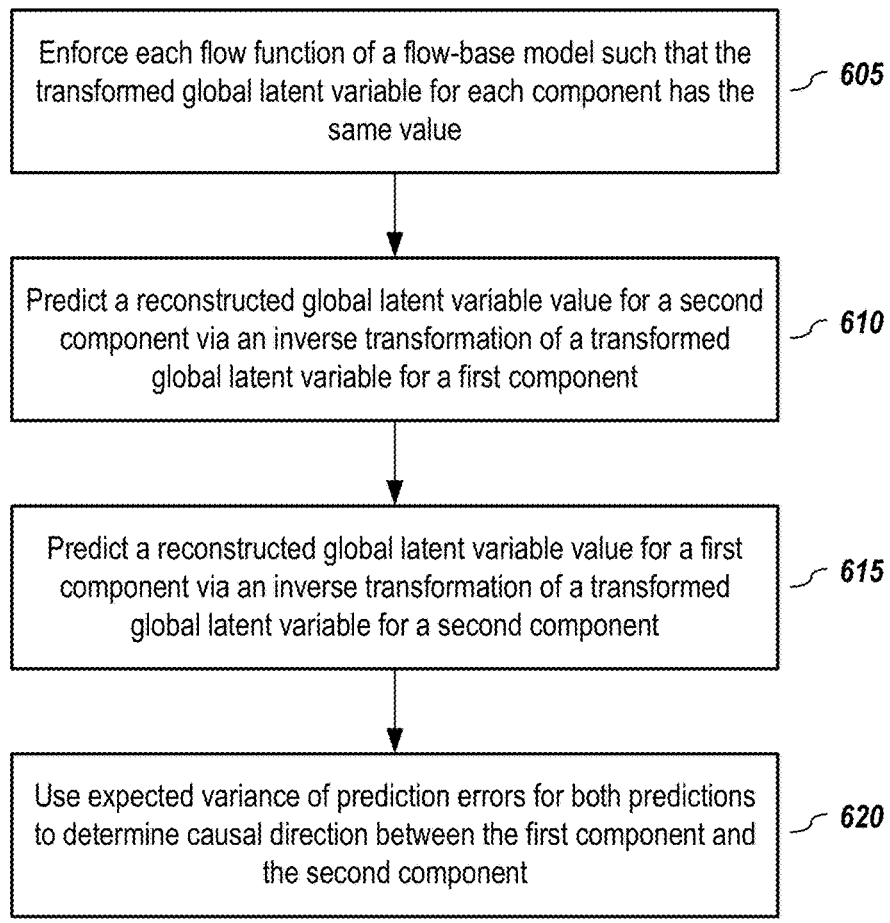
FIG. 6 depicts a process for causal relation detection, according to embodiments of the present disclosure.

FIG. 6 depicts a process to infer causal relation between two components using a trained flow-based model, according to embodiments of the present disclosure. In one or more embodiments, Maximizing the objective in equation (28) enforces (605) each component to have the same latent value, i.e., $z_0 = f_1(x_{0(1)}) = \ldots = f_K(z_{0(K)})$.

In one or more embodiments, the causal interaction between a first component (e.g., component i) and a second component (e.g., component j) of an input (e.g., an image) may be inferred using $z_{0(i)}$ and $z_{0(j)}$. The reconstructed global latent variable value ($\bar{z}_{0(j)}$) for component j may be predicted (610) with $z_{0(i)}$ via $f_j^{-1}(f_i(z_{0(i)}))$. Similarly, the reconstructed global latent variable value ($\bar{z}_{0(i)}$) for component i may be predicted (615) with $z_{0(j)}$ via $f_i^{-1}(f_j(z_{0(j)}))$. In one or more embodiments, expected variance of prediction errors for both predictions may be used to determine (620) the causal direction between the component i and component j. According to Theorem 3, if the expected variance, $\mathbb{E}$ [Var $[f_j^{-1}(f_i(z_{0(i)}))|z_{0(j)}]]$, of prediction error for $\bar{z}_{0(j)}$ (predicted using $z_{0(i)}$ is larger than the expected variance, $\mathbb{E}$ [Var $[f_i^{-1}(f_j(z_{0(j)}))|z_{0(i)}]]$, of prediction error for $\bar{z}_{0(i)}$ (predicted using $z_{0(j)}$), the component i is determined as a cause and component j is determined as an effect.

7. Embodiments of Disentanglement with TC

In one or more embodiments, for each component, the KL term for local latent variable $z_k$ in equation (3) in section C.2 may be rewritten as:

$$KL(q_e(z_k|x, m_k) \| p(z)) = I_{q_e}(x, m_k; z_k) + \quad (36)$$

$$\beta KL\left(q_e(z_k) \Big\| \prod_i q_e(z_{ki})\right) + \gamma \sum_i KL\left(q_e(z_{ki}) \Big\| \prod_i q_e(z_{ki})\right)$$

Here $z_{ki}$ is the ith entry of $z_k$. In one or more embodiments, the total correlation (TC) is penalized to enforce disentanglement of the local latent factors. In one or more embodiments, to compute the second term, a weighted approach may be used for estimating the distribution value q (z).

D. Experimental Results

Embodiments of the present disclosure were evaluated with both synthetic data and real-world data. For the synthetic data, it is simulated with a multi-object setting. With this dataset, it was demonstrated that embodiments of the present disclosure may outperform other methods when there are correlations between objects. Those embodiments were further validated using some real-world data. In one or more experiments, a causality dataset was also used to evaluate the model's component interaction discovery.

It shall be noted that these experiments and results are provided by way of illustration and were performed under specific conditions using a specific embodiment or embodiments; accordingly, neither these experiments nor their results shall be used to limit the scope of the disclosure of the current patent document.

1. Performance Metric

Some of the experiments were primarily focused on disentanglement, segmentation, and component interaction and performance comparison with MONet.

Disentanglement. Disentanglement evaluation metrics have been proposed previously. Some defined a metric that utilizes the accuracy that a low VC-dimension linear classifier can achieve at identifying a fixed ground truth factor. A drawback of this method is the lack of axis-alignment detection. Some proposed to use the mutual information gap (MIG) between latent variables and the ground truth factors to measure disentanglement. In one or more embodiments of the present disclosure, a regression-based approach was utilized for various experiments. The regression-based approach divides a latent space data into training, evaluation, and testing. The disentanglement score is obtained based on the performance of the learned regression model.

Segmentation. In one or more experiments, an adjusted rand index (ARI) was employed to evaluate the segmentation. The ground truth mask and predicted mask were converted to binary values, and the similarity of a pair of masks is based on the number of same entry values. In one or more experiments, the ARI score may be computed with the pair-wise similarity matrix.

Component Interaction. Causality may refer to the relations between two events, one (effect) preceded by the other (cause). In one or more experiments, the approach disclosed in Section C.5 was applied for correlation and causality component interaction discovery. The baseline for correlation in the experiments used MONet for latent representation learning and Hilbert-Schmidt Independence Criterion (HSIC) for independent testing. For a fair comparison, embodiments of the disclosed model (also referred as "CONet" hereinafter) and the baseline model (MONet) used the same network structures for the encoder, decoder, and attention network. Details about the network's structure embodiments may be found in the Section E. Comparisons were also made against existing methods on benchmark data. In the supplemental file, more results on additional datasets were presented.

2. Simulated Multi-Object Dataset

In this subsection, embodiments of the present disclosure were evaluated using simulated 2-object dataset comprising images generated with three types of objects, green squares, red circle, and blue diamonds. Multiple samples were for training, and multiple samples were used for testing. Some exemplary sample images are shown in the first row in FIG. 7 for both MONet and proposed embodiments. For the results in this subsection, the LASSO regressor with $\alpha=0.2$ is used for the disentanglement score. Object relations are incorporated into dataset to evaluate the performance of different models.

Figure 7:
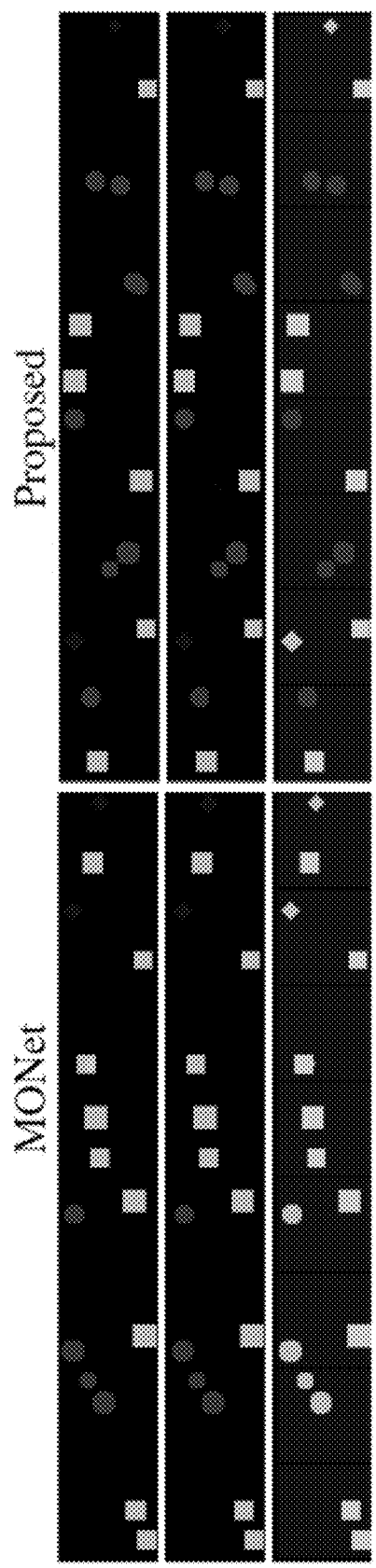
FIG. 7 depicts original images, reconstructed images, and mask images for Multi-Object Network (MONet) and a generative hierarchical model, according to embodiments of the present disclosure.

In the first set of experiments, images were generated to contain two objects. Only object pairs {circle, circle}, {circle, squire}, {squire, squire}, and {squire, diamond} appear in the same image. Circles and diamonds do not appear in the same image. The $\gamma$ is set to 0.5 for both models, and the $\beta$ values are tuned based on disentanglement and segmentation scores for both MONet and our model. FIG. 7 shows original image, reconstructed image, and mask image from MONet and a model embodiment ("Proposed") of the present disclosure after 50 epochs of iterations. Due to the interference of the object relationship, MONet is not able to distinguish between the diamond and the circle, as shown in FIG. 7. Furthermore, the model embodiment was investigated with more complicated object relations. In this set of generated images, each image has two or three objects. Similarly, circles and squires, squires, and diamonds can appear in one image. Circles and diamonds are not allowed to appear in the same image. Experimental results show that the proposed method may effectively disentangle structured latent factors. It was also noticed that structured latent space with TC penalization may also improve the disentanglement score of MONet. More results for this set of experiments are shown below.

Figure 8:
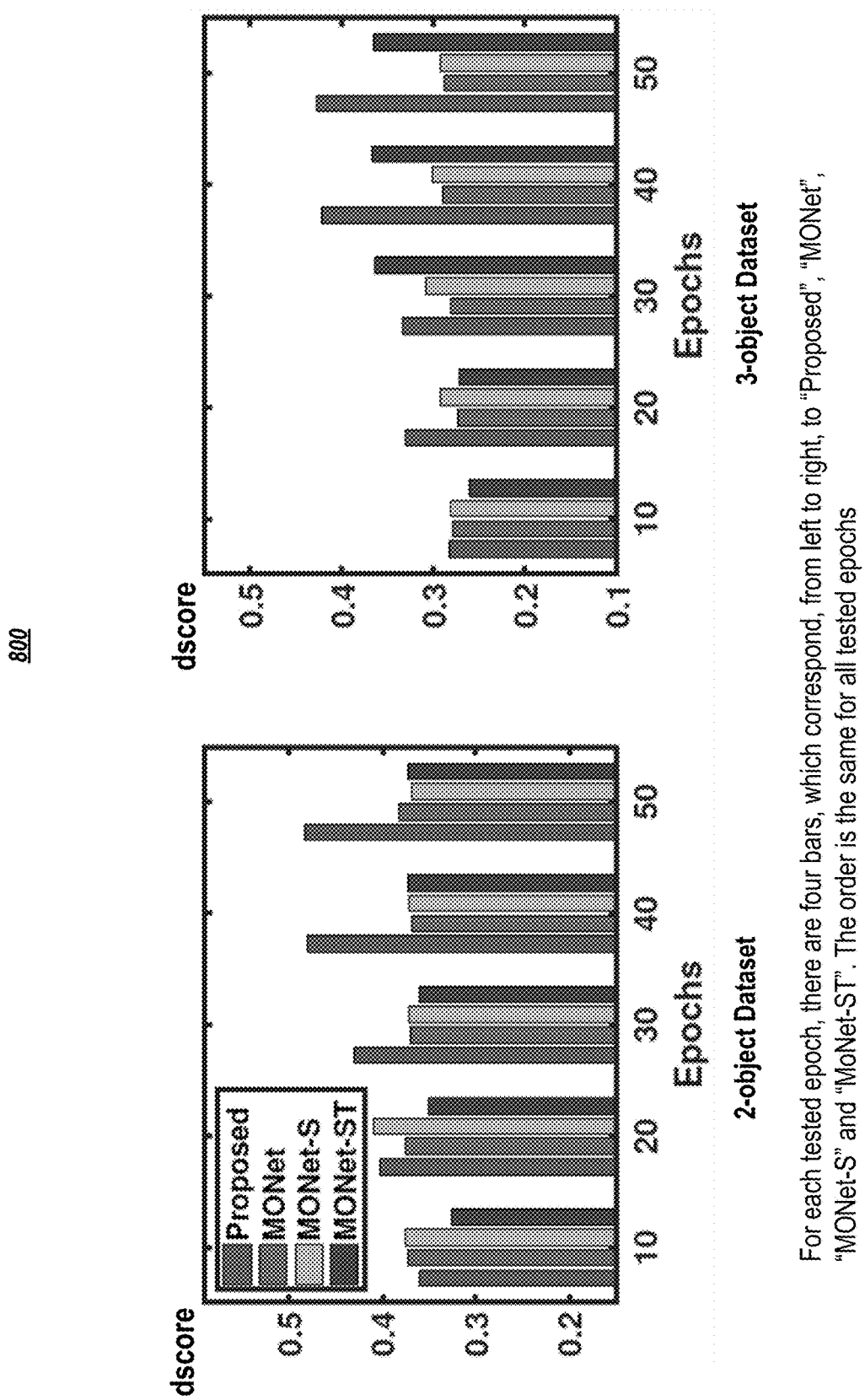
FIG. 8 depicts disentanglement score over epochs for different methods on 2-object and 3-object datasets, according to embodiments of the present disclosure.

More Results on Simulation Data Sets:

FIG. 8 gives the disentanglement scores (dscore) for different models along with different epoch numbers. In FIG. 8, for each epoch, there are four bars which correspond to "Proposed", MONet, MONet-S and MoNet-ST (starting from left to right), with the same order for all epochs. "MONet-S" means MONet with the structured latent variables introduced in the bi-level latent structure section in the main file. "MONet-ST" means MONet with structured latent variables in addition to the total correlation (TC). The left plot shows disentanglement scores (D-Scores) from different methods on the simulated 2-object dataset, and the right plot gives the D-Scores on 3-object dataset. In the 3-object dataset, each image contains two or three objects. Similar to the 2-object dataset, circles and squires, squires and diamonds may appear in one image, while circles and diamonds are not allowed to appear in the same image. These rules are the latent component relations of the datasets.

As shown in 2-object dataset plot in FIG. 8, the proposed aggregation prior with message passing may effectively capture latent factor structures and improve the disentanglement score on the 2-object dataset. The 3-object dataset plot in FIG. 8 depicts the disentanglement scores for different models on the simulated 3-object dataset. It may be seen that embodiments of the disclosed method may effectively disentangle structured latent factors. It was also noticed that structured latent space with TC penalization may improve the disentanglement score of MONet.

3. Evaluation Dataset

In one or more experiments, embodiments of the present disclosure were evaluated using an evaluation dataset. Each image in the evaluation dataset may comprise one or more shapes with a background. In one or more experiments, all the available features for disentanglement testing were used for evaluation. The features may include positions (x and y), shape, color (e.g., RGB values), orientation, scale, visibility (a binary feature indicating whether an object is not null). The disentanglement score may be computed with LASSO as the regressor and $\alpha=0.2$. In one or more experiments, $\gamma=0.5$ for both models, and $\beta$ is tuned for both methods. The disentanglement and segmentation performance are given in Table 2 after 20 epochs with a learning rate $10^{-4}$ for both models. Table 2 shows that embodiments of the present disclosure may achieve superior disentanglement and segmentation scores. More results on the segmentation score (ARI) for both methods are presented in the supplemental file. It may be seen that embodiments of the present disclosure may consistently improve the segmentation along with the updating steps. Embodiments of the present disclosure may produce visually more reasonable object segmentation.

TABLE 2

Disentanglement score and segmentation score for both MONet and the proposed method ("Proposed") tested on evaluation dataset.

| Methods | Disentangle | Segment |
| --- | --- | --- |
| MONet | 0.623 | 0.871 |
| Proposed | 0.636 | 0.873 |

Figure 9:
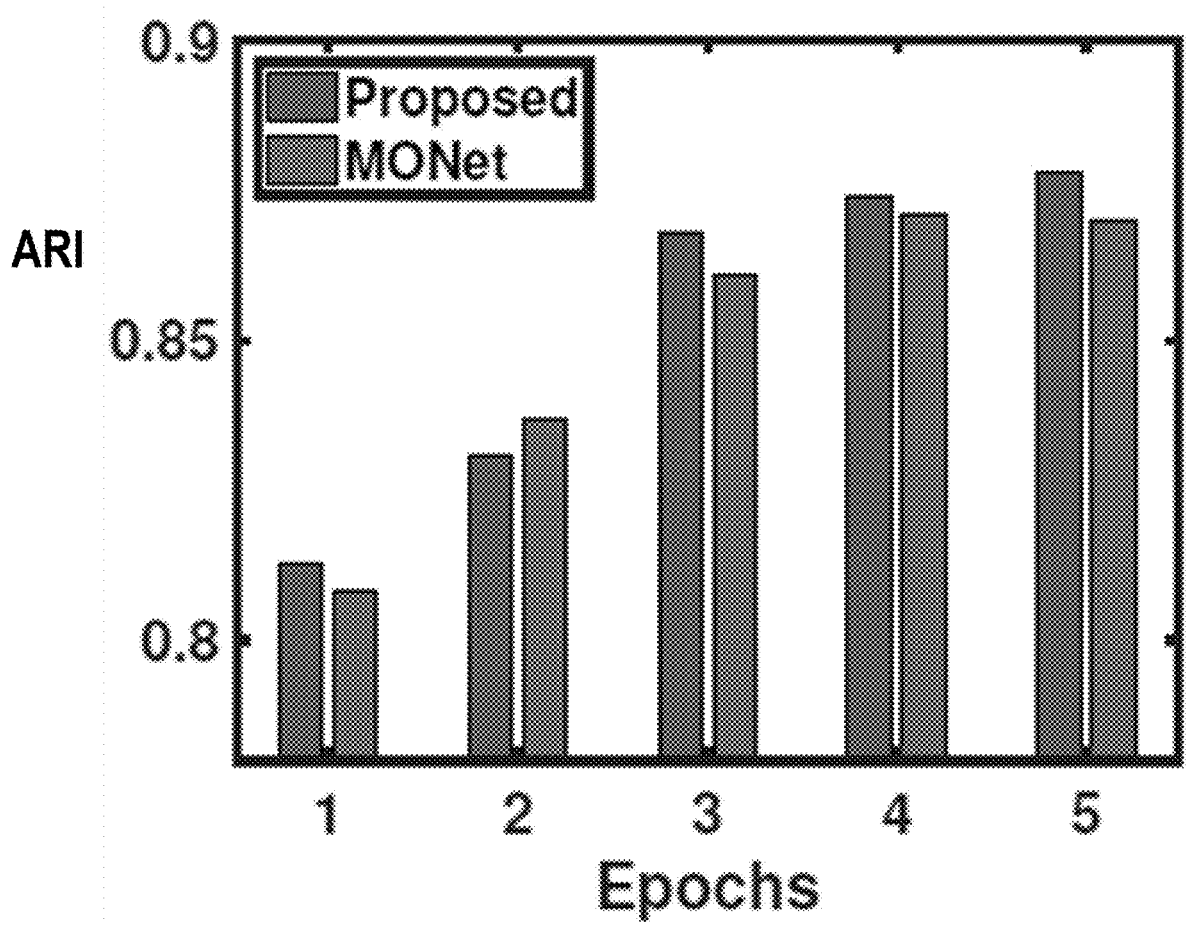
FIG. 9 depicts segmentation scores of different methods at different epochs on an evaluation dataset, according to embodiments of the present disclosure.

Additional Results on Evaluation Dataset:

FIG. 9 gives the values of segmentation score (ARI) for an embodiment of the present disclosure and MONet over epochs. For each epoch, there are two bars corresponding to "Proposed" and "MONet" (starting from left to right). The order is the same for all epochs. It may be seen that with adjustment information between components, embodiments of the present disclosure may consistently improve segmentation along with more epochs.

4. Polyomino Dataset

Figure 10:
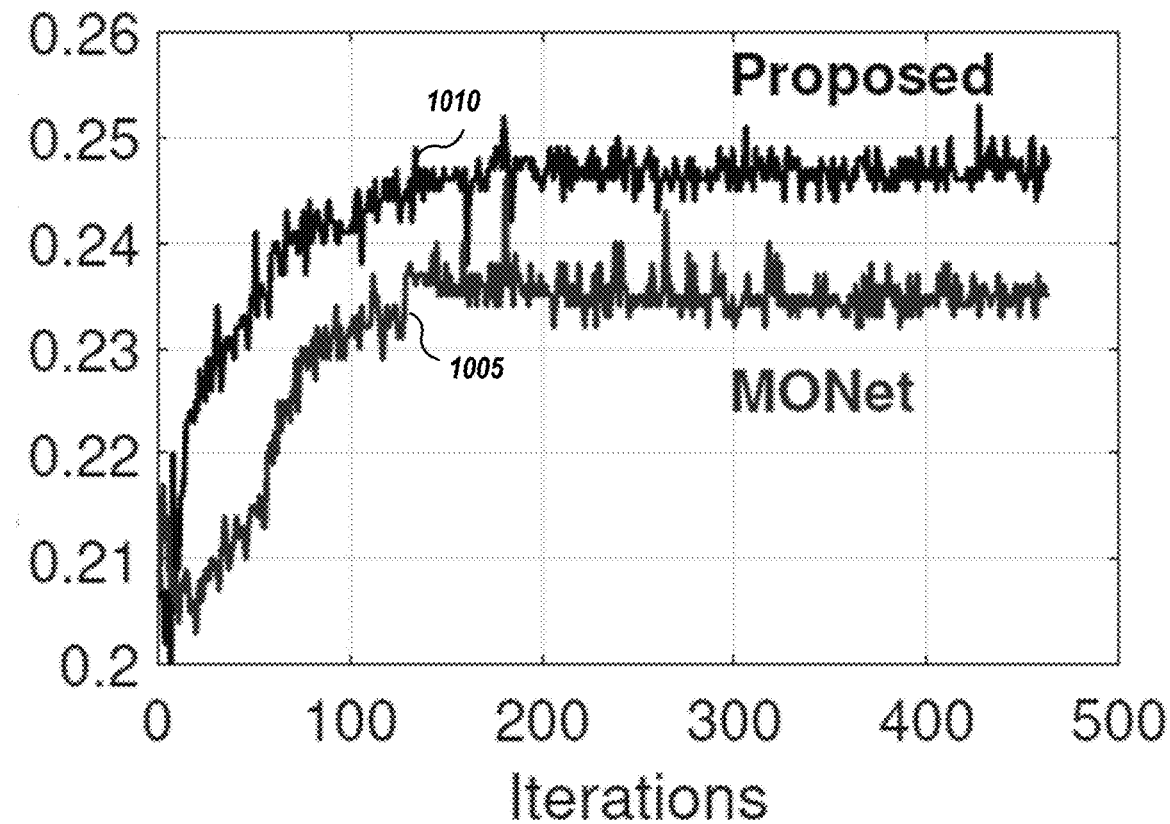
FIG. 10 depicts ARI scores over iterations on polyomino images, according to embodiments of the present disclosure.

In one or more experiments, multiple images from a polyomino dataset are used. Each polyomino image may comprise several polyominoes, e.g., tetrominoes, sampled from multiple different shapes or orientations. Four components for both MONet and embodiments of the present disclosure. Multiple images were randomly selected to evaluate disengagement and segmentation scores and multiple images were used to train both models. The experimental procedure follows the previous two datasets. Table 3 gives the disentanglement and segmentation scores for both methods after 1 epoch ($\alpha=0.1$ for the disentanglement score). It may be seen that embodiments of the present disclosure may improve both segmentation and disentanglement. FIG. 10 gives the segmentation ARI scores for MONet model 1005 and a model embodiment 1010 ("proposed") over iterations, showing that the model 1010 may continuously achieve higher segmentation scores. A large number of combinations of different colors and shapes lead to low segmentation scores. Clearly, the proposed method can well segment the objects.

TABLE 3

Disentanglement score and segmentation score for both MONet and a method embodiment ("Proposed") tested on polyominoes.

| Methods | Disentangle | Segment |
|---|---|---|
| MONet | 0.612 | 0.235 |
| Proposed | 0.625 | 0.248 |

5. Results on Component Interaction Detection

In this set of experiments, the causal-effect benchmark dataset was prepared with a causal discovery toolbox. Unlike existing methods for causal discovery, in one or more embodiments, each variable in a causal effect pair is tiled into a component in an image and latent representation is used to learn the causality relations. As each component only contains one variable, the model's variable segmentation capability may be tested with the composed images. In one or more experiments, simple causal-effect pairs are considered and the causal directions were ignored. A few pairs of variables with relations are tiled as component pixels in order to form images. Then, the composed images are passed into our network. Similar to previous experiments, the outputs include reconstructed components and component masks. Likewise, m-scores based on ARI are reported to show whether each reconstructed component has been discovered and segmented correctly. In addition, one or more experiments were also done to evaluate whether component pairs that have causal relations may be discovered as well.

In one or more experimental settings, for MONet, Hibert-Schmidt Independence Criterion (HSIC), a kernel-based nonparametric independence test is employed to score the relations between a pair of components. In one or more embodiments of the disclosed model (CONet), the conditional probability of latent variables in section C.4 was used for relationship learning. As shown in Table 4, embodiments of CONet ("Proposed") outperforms MONet in disentanglement score by 1.0%. Remarkably, embodiments of CONet may find much more number of correct relation pairs than MONet. Such a result shows that embodiments of CONet have a stronger capacity in causality discovery besides component segmentation. More results on component interaction detection are available in section D.7.

TABLE 4

Disentanglement score and the number of casual relation pair discovered.

| Methods | Segment | Relation |
|---|---|---|
| MONet | 0.888 | 188 |
| Proposed | 0.895 | 412 |

6. Results on Facial Image Test

Figure 11:
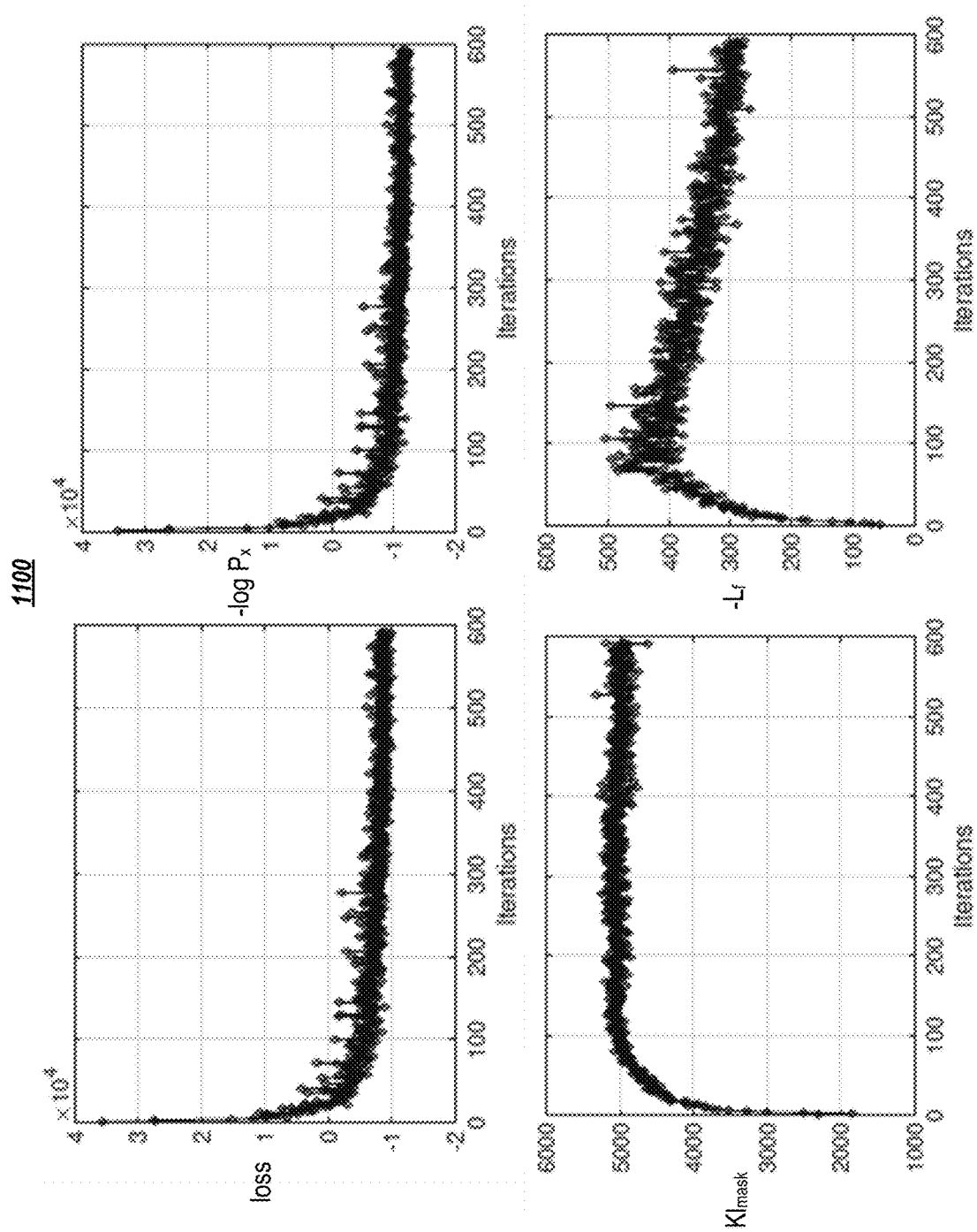
FIG. 11 depicts values of different terms of a loss over iterations, according to embodiments of the present disclosure.

Multiple facial images were randomly picked for training and testing. Those facial images comprise multiple attributes, including gender, hair color, with glasses or not, etc. In one or more experiments, at least some attributes were used to assess the disentanglement for both MONet and an embodiment of the present disclosure. Table 5 gives the disentanglement scores for both models ($\alpha=0.3$). The plots in FIG. 11 present the values of various terms in the loss (loss, $-\log P$, $KL_{mask}$, and $-L_f$) over iterations. The upper left plot in FIG. 11 is negative ELBO value.

TABLE 5

Disentanglement score for both MONet and a method embodiment ("Proposed").

| Methods | Disentanglement |
|---|---|
| MONet | 0.884 |
| Proposed | 0.935 |

7. Results on Causal Direction Detection

The setup for this set of experiments may be similar to section D.5. In one or more experiments, the causal-effect benchmark data set 'tuebingen' prepared with a causal discovery toolbox was employed. Four pairs of causal effect variables were taken and each variable was tiled in a causal-effect pair into a component in an image. Latent representation was used to learn causality relations. As each component only contains one variable, the component's latent $z_{0(k)}$ was used for causal detection.

Embodiments of the present disclosure were compared to MONet+RECI method. For MONet +RECI method, the latent representation for each component was learned with MONet, and then the variance of regression error between latent representations was used to determine causal directions. In this baseline method, the implementation of RECI in causal discovery toolbox was used. For embodiments using CONet, scores defined in Theorem 3 were computed according to the prediction errors with the aggregation model, and then the scores were used to determine the causal directions.

To calculate the accuracy of causal detection, the ground truth label for each component was obtained from the models by comparing its mask with the ground truth masks in the data synthesis stage. A list of component pairs with causality scores were obtained after thresholding with a value $\gamma$. Afterwards, the percentage of correct causal direction pairs was calculated. Table 6 gives the accuracy of correct causal pairs with different threshold values. It may be seen that embodiments of the disclosed framework always learn better representation for causal detection.

TABLE 6

Causal detection accuracy (%) on 'tuebingen' at different threshold values.

| Methods | $\gamma = 1.0E - 3$ | $\gamma = 1.0E - 7$ |
|---|---|---|
| MONet + RECI | 9.14 | 6.17 |
| Proposed | 11.07 | 9.65 |

E. Embodiments of Network Structure

This section discloses some network structure embodiments for the encoder and decoder, which are shown in Table 7 and Table 8, respectively. The attention network employs one U-net with 5 blocks. The decoder is a spatial broadcast decoder to encourage the VAE to learn spatial features.

TABLE 7

A Network structure embodiment of the encoder.
$z_{dim}$ is the length of $z_k$ plus the length of $z_0$.

Encoder

| Layer | Number of Output | Kernel | Stride | Activation function |
|---|---|---|---|---|
| Input x | 4*64*64 | | | |
| Convolution | 32*32*32 | 3*3 | 2 | ReLU |
| Convolution | 32*16*16 | 3*3 | 2 | ReLU |
| Convolution | 64*8*8 | 3*3 | 2 | ReLU |
| Convolution | 64*4*4 | 3*3 | 2 | ReLU |
| Fully-Connected | $2 \times z_{dim}$ | | | |

TABLE 8

A Network structure embodiment of the decoder.

Decoder

| Layer | Number of Output | Kernel | Stride | Activation function |
|---|---|---|---|---|
| Input $[z_k, z_{0(k)}]$ | $(z_{dim} + 2) *72*72$ | | | |
| Convolution | 32*70*70 | 3*3 | 1 | ReLU |
| Convolution | 32*68*68 | 3*3 | 1 | ReLU |
| Convolution | 32*66*66 | 3*3 | 1 | ReLU |
| Convolution | 32*64*64 | 3*3 | 1 | ReLU |
| Convolution | 4*64*64 | 1*1 | 1 | ReLU |

F. Some Conclusions

In the present disclosure, embodiments of a novel bi-level framework are disclosed to learn disentangled structured latent factors. In one or more embodiments, the flow-based structure prior of latent presentation enables the model to learn interactions among components via a message-passing scheme. The framework improved existing scene segmentation methods regarding both disentanglement and segmentation. It is shown that the framework embodiments may capture the inner interactions between data components in the experiments.

One skilled in the art shall understand that the present disclosure may be applicable to various scenarios, e.g., physical interaction extraction. Physical interaction between objects is an important common sense or prior knowledge for humans to make actionable decisions. Objects placed within static scenes commonly adhere to certain relations, such as pen and paper, book and book bookshelf, cup, and desk, etc. Another useful application is to integrate embodiments of the present disclosure with reinforcement learning. With the learned relationships between objects, the searching space for an agent may be significantly reduced and make a reasonable decision more efficiently.

In one or more embodiments of the present disclosure, data segmentation and representation learning are integrated by developing a bi-level VAE framework. With the inference method, the bi-level VAE framework may learn more meaningful structural representations of the data. Besides the data sets presented in the experiments, the framework may be applied to other types of data. Embodiments of the present disclosure may potentially enlarge the application of unsupervised learning and self-supervised learning to broader scenarios, such as information extraction, knowledge discovery, etc.

G. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen and/or video display. The computing system may also include one or more buses operable to transmit communications between the various hardware components.

Figure 12:
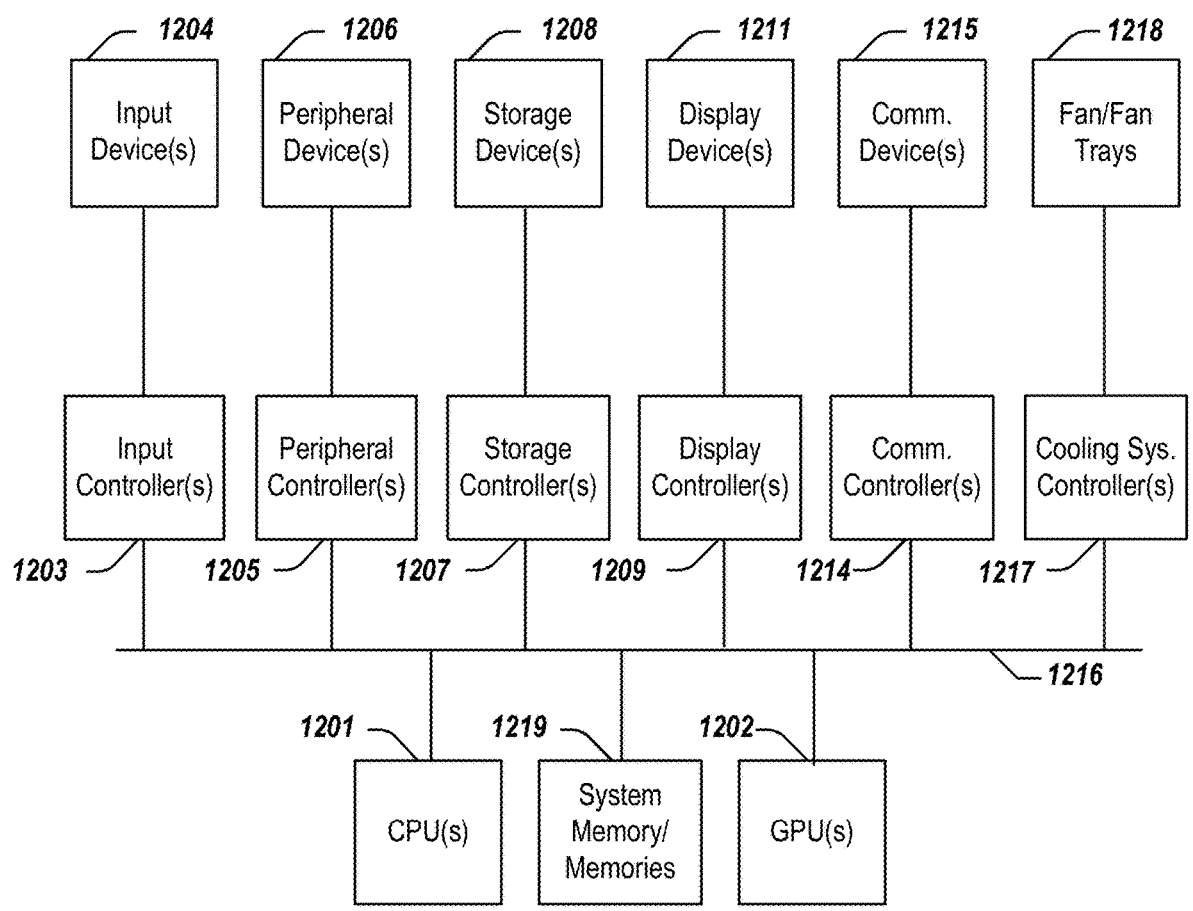
FIG. 12 depicts a simplified block diagram of a computing device/information handling system, according to embodiments of the present disclosure.

FIG. 12 depicts a simplified block diagram of an information handling system (or computing system), according to embodiments of the present disclosure. It will be understood that the functionalities shown for system 1200 may operate to support various embodiments of a computing system—although it shall be understood that a computing system may be differently configured and include different components, including having fewer or more components as depicted in FIG. 12.

In As illustrated in FIG. 12, the computing system 1200 includes one or more central processing units (CPU) 1201 that provides computing resources and controls the computer. CPU 1201 may be implemented with a microprocessor or the like, and may also include one or more graphics processing units (GPU) 1202 and/or a floating-point coprocessor for mathematical computations. In one or more embodiments, one or more GPUs 1202 may be incorporated within the display controller 1209, such as part of a graphics card or cards. The system 1200 may also include a system memory 1219, which may comprise RAM, ROM, or both.

A number of controllers and peripheral devices may also be provided, as shown in FIG. 12. An input controller 1203 represents an interface to various input device(s) 1204, such as a keyboard, mouse, touchscreen, and/or stylus. The computing system 1200 may also include a storage controller 1207 for interfacing with one or more storage devices 1208 each of which includes a storage medium such as magnetic tape or disk, or an optical medium that might be used to record programs of instructions for operating systems, utilities, and applications, which may include embodiments of programs that implement various aspects of the present disclosure. Storage device(s) 1208 may also be used to store processed data or data to be processed in accordance with the disclosure. The system 1200 may also include a display controller 1209 for providing an interface to a display device 1211, which may be a cathode ray tube (CRT) display, a thin film transistor (TFT) display, organic light-emitting diode, electroluminescent panel, plasma panel, or any other type of display. The computing system 1200 may also include one or more peripheral controllers or interfaces 1205 for one or more peripherals 1206. Examples of peripherals may include one or more printers, scanners, input devices, output devices, sensors, and the like. A communications controller 1214 may interface with one or more communication devices 1215, which enables the system 1200 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1200 comprises one or more fans or fan trays 1218 and a cooling subsystem controller or controllers 1217 that monitors thermal temperature(s) of the system 1200 (or components thereof) and operates the fans/fan trays 1218 to help regulate the temperature.

In the illustrated system, all major system components may connect to a bus 1216, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for learning latent structural relations comprising:
   receiving an input comprising one or more components;
   generating, using an attention network, a mask corresponding to each of the one or more components, the mask indicating probabilities of at least a subset of elements of the input belonging to each of the one or more components;
   encoding, using an encoder, the input and each mask into a latent variable, the latent variable comprises a global latent variable and a local latent variable for a corresponding component;
   transforming, using a flow-based model comprising one or more flow functions, one or more global latent variables into one or more transformed global latent variables, each flow function implements a forward transformation for one of the one or more global latent variables to obtain a corresponding transformed global latent variable;
   generating an aggregated global latent variable based on the one or more transformed global latent variables;
   transforming, using the flow-based model, the aggregated global latent variable into one or more reconstructed global latent variables corresponding to the one or more components;
   generating, using a decoder, a pair of a reconstructed mask and a reconstructed component for each of the one or more components using one reconstructed global latent variable and one local latent variable corresponding to each of the one or more components; and using the reconstructed components and the reconstructed masks corresponding to the one or more components for one or more data processing applications in an inference process, or for constructing one or more losses for training in a training process.

2. The computer-implemented method of claim 1 wherein the input is an image with each of the one or more components representing an object in the image and the elements of the input representing pixels in the image, or a data sample with each of the one or more components representing a portion in the data sample and elements of the input representing data points in the data sample.

3. The computer-implemented method of claim 1 wherein the aggregated global latent variable is an average of the one or more transformed global latent variables corresponding to the one or more components.

4. The computer-implemented method of claim 1 wherein the one or more flow functions are invertible functions.

5. The computer-implemented method of claim 4 wherein each reconstructed global latent variable is obtained by a backward transformation of the aggregated global latent variable using an inverted function of a corresponding flow function.

6. The computer-implemented method of claim 5 wherein the one or more flow function of the flow-base model are enforced, by maximizing an evidence lower bound (ELBO) of the flow-base model, to generate the one or more global latent variables for the one or more components of a same value.

7. The computer-implemented method of claim 6 further comprising:
obtaining, via a backward transformation of a transformed global latent variable for a first component of the one or more components, a prediction of a reconstructed global latent variable value for a second component of the one or more components;
obtaining, via a backward transformation of a transformed global latent variable for the second component, a prediction of a reconstructed global latent variable value for the first component; and
determining, using expected variance of prediction error for the prediction of the reconstructed global latent variable value for the second component and expected variance of prediction error for the prediction of the reconstructed global latent variable value for the first component, a causal direction between the first component and the second component.

8. The computer-implemented method of claim 7 wherein:
in response to the expected variance of prediction error for the prediction of the reconstructed global latent variable value for the second component being larger than the expected variance of prediction error for the prediction of the reconstructed global latent variable value for the first component, determining the first component as a cause and the second component as an effect.

9. The computer-implemented method of claim 1 wherein the mask corresponding to each of the one or more components is generated sequentially based on the input and a scope for each component, the scope for each component is obtained based on a scope and a mask corresponding to a previously processed component.

10. A system for learning latent structural relations comprising:
one or more processors; and
a non-transitory computer-readable medium or media comprising one or more sets of instructions which, when executed by at least one of the one or more processors, causes steps to be performed comprising:
receiving an input comprising one or more components;
yielding, using an attention network, a mask corresponding to each of the one or more components, the mask indicating probabilities of at least a subset of elements of the input belonging to each of the one or more components;
encoding, using an encoder, the input and each mask into a latent variable, the latent variable comprises a global latent variable and a local latent variable for a corresponding component;
transforming, using a flow-based model comprising one or more flow functions, one or more global latent variables for the one or more components into one or more transformed global latent variables, each flow function implements a forward transformation for one of the one or more global latent variables to obtain a corresponding transformed global latent variable;
generating an aggregated global latent variable based on the one or more transformed global latent variables;
transforming, using the flow-based model, the aggregated global latent variable into one or more reconstructed global latent variables corresponding to the one or more components;
generating, using a decoder, a pair of a reconstructed mask and a reconstructed component for each of the one or more components using one reconstructed global latent variable and one local latent variable corresponding to each of the one or more components; and
using the reconstructed components and the reconstructed masks corresponding to the one or more components for one or more data processing applications in an inference process, or for constructing one or more losses for training in a training process.

11. The system of claim 10 wherein the input is an image with each of the one or more components representing an object in the image and elements representing pixels in the image, or a data sample with each of the one or more components representing a portion in the data sample and elements representing data points in the data sample.

12. The system of claim 10 wherein the aggregated global latent variable is an average of the transformed global latent variables corresponding to the one or more components.

13. The system of claim 10 wherein the one or more flow functions are invertible functions.

14. The system of claim 13 wherein each reconstructed global latent variable is obtained by a backward transformation of the aggregated global latent variable using an inverted function of a corresponding flow function.

15. The system of claim 14 wherein the one or more flow function of the flow-base model are enforced, by maximizing an evidence lower bound (ELBO) of the flow-base model, to generate global latent variables for the one or more components of a same value.

16. A non-transitory computer-readable medium or media comprising one or more sequences of instructions which, when executed by at least one processor, causes steps for learning latent structural relations comprising:

receiving an input comprising one or more components;

generating, using an attention network, a mask corresponding to each of the one or more components, the mask indicating probabilities of at least a subset of elements of the input belonging to each of the one or more components;

encoding, using an encoder, the input and each mask into a latent variable, the latent variable comprises a global latent variable and a local latent variable for a corresponding component;

transforming, using a flow-based model comprising one or more flow functions, one or more global latent variables into one or more transformed global latent variables, each flow function implements a forward transformation for one of the one or more global latent variables to obtain a corresponding transformed global latent variable;

generating an aggregated global latent variable based on the one or more transformed global latent variables;

transforming, using the flow-based model, the aggregated global latent variable into one or more reconstructed global latent variables corresponding to the one or more components;

generating, using a decoder, a pair of a reconstructed mask and a reconstructed component for each of the one or more components using one reconstructed global latent variable and one local latent variable corresponding to each of the one or more components; and using the reconstructed components and the reconstructed masks corresponding to the one or more components for one or more data processing applications in an inference process, or for constructing one or more losses for training in a training process.

17. The non-transitory computer-readable medium or media of claim 16 wherein the aggregated global latent variable is an average of the transformed global latent variables corresponding to the one or more components.

18. The non-transitory computer-readable medium or media of claim 17 wherein the one or more flow functions are invertible functions, each reconstructed global latent variable is obtained by a backward transformation of the aggregated global latent variable using an inverted function of a corresponding flow function.

19. The non-transitory computer-readable medium or media of claim 18 wherein the steps for learning latent structural relations further comprising:

obtaining, via a backward transformation of a transformed global latent variable for a first component of the one or more components, a prediction of the reconstructed global latent variable value for a second component of the one or more components;

obtaining, via a backward transformation of a transformed global latent variable for the second component, a predicted reconstructed global latent variable value for the first component; and determining, using expected variance of prediction error for the prediction of the reconstructed global latent variable value for the second component and expected variance of prediction error for the prediction of the reconstructed global latent variable value for the first component, a causal direction between the first component and the second component.

20. The non-transitory computer-readable medium or media of claim 19 wherein the steps for learning latent structural relations further comprising:

in response to a ratio between the expected variance of prediction error for the prediction of the reconstructed global latent variable value for the second component and the expected variance of prediction error for the prediction of the reconstructed global latent variable value for the first component being larger than 1, determining the first component as a cause and the second component as an effect.

* * * * *